US012720382B2

(12) United States Patent
Maleki et al.

(10) Patent No.: US 12,720,382 B2
(45) Date of Patent: Aug. 25, 2026

(54) ADDITIONAL REFERENCE SIGNALS FOR UES IN NON-CONNECTED STATES

(71) Applicant: Telefonaktiebolaget LM Ericsson (publ), Stockholm (SE)

(72) Inventors: Sina Maleki, Malmö (SE); Andres Reial, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 486 days.

(21) Appl. No.: 18/028,160

(22) PCT Filed: Oct. 13, 2021

(86) PCT No.: PCT/EP2021/078362
§ 371 (c)(1),
(2) Date: Mar. 23, 2023

(87) PCT Pub. No.: WO2022/079124
PCT Pub. Date: Apr. 21, 2022

(65) Prior Publication Data

US 2023/0370918 A1 Nov. 16, 2023

Related U.S. Application Data

(60) Provisional application No. 63/091,503, filed on Oct. 14, 2020, provisional application No. 63/090,762, filed on Oct. 13, 2020.

(51) Int. Cl.
*H04W 36/00* (2009.01)
*H04W 36/08* (2009.01)
(Continued)

(52) U.S. Cl.
CPC ... *H04W 36/0085* (2018.08); *H04W 36/0072* (2013.01); *H04W 36/085* (2023.05); *H04W 48/20* (2013.01); *H04W 52/04* (2013.01)

(58) Field of Classification Search
CPC ......... H04W 36/0085; H04W 36/0072; H04W 36/085; H04W 48/20; H04W 52/04
(Continued)

(56) References Cited

U.S. PATENT DOCUMENTS

| | | | |
|---|---|---|---|
| 7,872,996 B2 | 1/2011 | Kimura et al. |
| 2007/0173245 A1 | 7/2007 | Aoki et al. |

(Continued)

FOREIGN PATENT DOCUMENTS

| | | |
|---|---|---|
| CN | 110557812 A | 12/2019 |
| CN | 113259071 A | 8/2021 |

(Continued)

OTHER PUBLICATIONS

"Additional synchronization provision", 3GPP TSG RAN WG1 Meeting #90, R1-1714048, Prague, Czech Republic, Aug. 21-25, 2017, pp. 1-6.

(Continued)

*Primary Examiner* — Kwang B Yao
*Assistant Examiner* — Bradley D Lytle, Jr.
(74) *Attorney, Agent, or Firm* — Murphy, Bilak & Homiller, PLLC

(57) ABSTRACT

Embodiments include methods for cell reselection by a user equipment (UE) in a wireless network. Such methods include determining one or more first resources associated with transmission of connected-state reference signals (RS) by the wireless network in the UE's serving cell and/or in one or more neighbor cells while the UE is in a non-connected state. Such methods include using the one or more first resources, performing cell reselection measurements on the connected-state RS transmitted in the serving cell and/or in any of the neighbor cells. Other embodiments include complementary methods for a network node, as well as UEs and network nodes configured to perform such methods.

20 Claims, 10 Drawing Sheets

Receiving, from a network node that provides the UE's serving cell, a measurement configuration including one or more of the following: a first indication of UE permission to utilize connected-state RS for cell reselection measurements; a second indication of a specific type of connected-state RS usable for cell reselection measurements; a third indication of at least one resource associated with transmission of connected-state RS usable for cell reselection measurements; and a scaling factor related to a difference between respective transmission powers for the connected-state RS and for synchronization signal/PBCH block (SSB). 1010

Determining one or more first resources associated with transmission of connected-state RS, by the wireless network, in the UE's serving cell and/or one or more neighbor cells while the UE is in a non-connected state. 1020

Selecting the first resources from the resources indicated by the third indication. 1021

Performing blind decoding of SI broadcast in the one or more neighbor cells. 1022

Estimating a first expected energy consumption associated with cell reselection measurements based on the connected-state RS. 1030

Estimating a second expected energy consumption associated with cell reselection measurements based on SSB. 1040

Using the one or more first resources, performing cell reselection measurements on the connected-state RS transmitted in the serving cell and/or in any of the neighbor cells. 1050

Performing further cell reselection measurements based on SSB transmitted by the wireless network in the UE's serving cell and/or in one or more neighbor cells. 1060

Determining whether a difference between the cell reselection measurements and the further cell reselection measurements exceeds a threshold. 1070

When the difference exceeds the threshold, refraining from performing subsequent cell reselection measurements based on connected-state RS. 1075

Based on the cell reselection measurements and the further cell reselection measurements, estimating a scaling factor between respective transmission powers for the connected-state RS and for the SSB. 1080

Scaling cell reselection measurements based on a received or determined scaling factor. 1085

Remaining in a low-energy state during one or more second occasions during which synchronization signal/PBCH block (SSB) is transmitted by the wireless network. 1090

Performing cell reselection to one of the neighbor cells based on the cell reselection measurements. 1095

(51) Int. Cl.
*H04W 48/20* (2009.01)
*H04W 52/04* (2009.01)

(58) Field of Classification Search
USPC ................................ 370/329, 331, 252, 235
See application file for complete search history.

(56) References Cited

U.S. PATENT DOCUMENTS

| | | | | |
|---|---|---|---|---|
| 2013/0163530 | A1 | 6/2013 | Chen et al. | |
| 2014/0044040 | A1 | 2/2014 | Chen et al. | |
| 2016/0345348 | A1 | 11/2016 | Chae et al. | |
| 2018/0270895 | A1 | 9/2018 | Park et al. | |
| 2018/0368088 | A1 | 12/2018 | Nagaraja et al. | |
| 2019/0007897 | A1 | 1/2019 | Ng et al. | |
| 2019/0053294 | A1 | 2/2019 | Xia et al. | |
| 2019/0053320 | A1 | 2/2019 | Islam et al. | |
| 2019/0059054 | A1 | 2/2019 | Lee et al. | |
| 2019/0116461 | A1 | 4/2019 | Callender et al. | |
| 2019/0215117 | A1 | 7/2019 | Lee et al. | |
| 2019/0254110 | A1 | 8/2019 | He et al. | |
| 2019/0319686 | A1 | 10/2019 | Chen et al. | |
| 2019/0387490 | A1 | 12/2019 | Li et al. | |
| 2020/0137602 | A1* | 4/2020 | Zhang | H04W 72/23 |
| 2020/0145963 | A1* | 5/2020 | Balasubramanian | H04W 72/23 |
| 2020/0162976 | A1 | 5/2020 | Yang et al. | |
| 2020/0204312 | A1 | 6/2020 | Xu et al. | |
| 2021/0067994 | A1* | 3/2021 | Chen | H04W 48/12 |
| 2021/0092627 | A1 | 3/2021 | Radulescu et al. | |
| 2021/0176656 | A1* | 6/2021 | Sang | H04W 36/302 |
| 2021/0185757 | A1 | 6/2021 | Purkayastha et al. | |
| 2021/0195656 | A1 | 6/2021 | Lei et al. | |
| 2021/0235381 | A1 | 7/2021 | Yang et al. | |
| 2021/0321413 | A1 | 10/2021 | Shin et al. | |
| 2021/0392525 | A1* | 12/2021 | Kaikkonen | H04W 24/08 |
| 2022/0322231 | A1 | 10/2022 | Sun et al. | |
| 2022/0369284 | A1 | 11/2022 | Gonzalez et al. | |
| 2023/0049119 | A1 | 2/2023 | Liu | |
| 2023/0056906 | A1 | 2/2023 | Yang et al. | |
| 2023/0072679 | A1* | 3/2023 | Lauridsen | H04B 7/18513 |
| 2023/0076409 | A1 | 3/2023 | Elkotby et al. | |
| 2023/0078444 | A1 | 3/2023 | Maleki et al. | |
| 2023/0083399 | A1 | 3/2023 | Wang et al. | |
| 2023/0085484 | A1 | 3/2023 | Liu | |
| 2023/0189369 | A1* | 6/2023 | Li | H04W 76/18 370/329 |

FOREIGN PATENT DOCUMENTS

| | | | |
|---|---|---|---|
| CN | 113260022 | A | 8/2021 |
| CO | 2019003376 | A2 | 4/2019 |
| CO | 2019003511 | A2 | 6/2019 |
| EP | 3276847 | A1 | 1/2018 |
| EP | 3739939 | A1 | 11/2020 |
| WO | 2019029711 | A1 | 2/2019 |
| WO | 2019137424 | A1 | 7/2019 |

OTHER PUBLICATIONS

"3GPP TS 38.133 V0.4.0", 3rd Generation Partnership Project; Technical Specification Group Radio Access Network; New Radio(NR); Requirements for support of radio resource management (Release 15), Dec. 2017, pp. 1-42.

"3GPP TS 38.211 V16.3.0", 3rd Generation Partnership Project; Technical Specification Group Radio Access Network; NR; Physical channels and modulation (Release 16), Sep. 2020, pp. 1-22.

"3GPP TS 38.214 V15.0.0", 3rd Generation Partnership Project; Technical Specification Group Radio Access Network; NR; Physical layer procedures for data (Release 15), Dec. 2017, pp. 1-71.

"3GPP TS 38.215 V16.0.1", 3rd Generation Partnership Project; Technical Specification Group Radio Access Network; NR; Physical layer measurements (Release 16), Jan. 2020, pp. 1-21.

"3GPP TS 38.401 V15.7.0", 3rd Generation Partnership Project; Technical Specification Group Radio Access Network; NG-RAN; Architecture description (Release 15), Dec. 2019, pp. 1-47.

"3GPP TS 38.304 V16.1.0", 3rd Generation Partnership Project; Technical Specification Group Radio Access Network; NR; User Equipment (UE) procedures in Idle mode and RRC Inactive state (Release 16), Jul. 2020, pp. 1-39.

"3GPP TS 23.501 V16.2.0", 3rd Generation Partnership Project; Technical Specification Group Services and System Aspects; System Architecture for the 5G System (5GS); Stage 2 (Release 16), Sep. 2019, pp. 1-391.

"Consideration on TRS/CSI-RS occasion(s) for idle/inactive UEs", 3GPP TSG RAN WG1 Meeting #102, R1-2006269, e-Meeting, Aug. 17-28, 2020, pp. 1-5.

"CSI-RS usage by RRC_Inactive and RRC_Idle UEs", 3GPP TSG-RAN WG2 NR AH#3, Tdoc R2-1800349, Vancouver, Canada, Jan. 22-26, 2018, pp. 1-2.

"Provisioning of potential TRS/CSI-RS occasion(s) for Idle/Inactive UEs", 3GPP TSG RAN WG1 #102-e, Tdoc R1-2006666, e-Meeting, Aug. 17-28, 2020, pp. 1-5.

"Provisioning of potential TRS/CSI-RS occasion(s) for Idle/Inactive UEs", 3GPP TSG RAN WG1 #103-e, Tdoc R1-2009201, e-Meeting, Oct. 26-Nov. 13, 2020, pp. 1-12.

"3GPP TS 38.213 V16.3.0", 3rd Generation Partnership Project; Technical Specification Group Radio Access Network; NR; Physical layer procedures for control (Release 16), Sep. 2020, pp. 1-179.

"3GPP TS 38.304 V16.2.0", 3rd Generation Partnership Project; Technical Specification Group Radio Access Network; NR; User Equipment (UE) procedures in Idle mode and RRC Inactive state (Release 16), Sep. 2020, pp. 1-39.

"3GPP TS 36.133 V16.3.0", 3rd Generation Partnership Project; Technical Specification Group Radio Access Network; Evolved Universal Terrestrial Radio Access (E-UTRA); Requirements for support of radio resource management (Release 16), Sep. 2019, pp. 1-3732.

"3GPP TS 38.211 V16.0.0", 3rd Generation Partnership Project; Technical Specification Group Radio Access Network; NR; Physical channels and modulation (Release 16), Dec. 2019, pp. 1-129.

"3GPP TS 38.214 V16.0.0", 3rd Generation Partnership Project; Technical Specification Group Radio Access Network; NR; Physical layer procedures for data (Release 16), Dec. 2019, pp. 1-147.

"3GPP TS 38.214 V16.3.0", 3rd Generation Partnership Project; Technical Specification Group Radio Access Network; NR; Physical layer procedures for data (Release 16), Sep. 2020, pp. 1-166.

"3GPP TS 38.331 V15.8.0", 3rd Generation Partnership Project; Technical Specification Group Radio Access Network; NR; Radio Resource Control (RRC) protocol specification (Release 15), Dec. 2019, pp. 1-532.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"Discussion on power saving signal triggering UE adaptation", 3GPP TSG RAN WG1 #96bis, R1-1904738, Xi'an, China, Apr. 8-12, 2019, pp. 1-7.

* cited by examiner

```
-- ASN1START
-- TAG-NZP-CSI-RS-RESOURCE-START
NZP-CSI-RS-Resource ::=            SEQUENCE {
    nzp-CSI-RS-ResourceId              NZP-CSI-RS-ResourceId,
    resourceMapping                    CSI-RS-ResourceMapping,
    powerControlOffset                 INTEGER (-8..15),
    powerControlOffsetSS               ENUMERATED{db-3, db0, db3, db6}     OPTIONAL,   -- Need R
    scramblingID                       ScramblingId,
    periodicityAndOffset               CSI-ResourcePeriodicityAndOffset    OPTIONAL,   -- Cond PeriodicOrSemiPersistent
    qcl-InfoPeriodicCSI-RS             TCI-StateId                         OPTIONAL,   -- Cond Periodic
    ...
}
-- TAG-NZP-CSI-RS-RESOURCE-STOP
-- ASN1STOP
```

Fig. 8A

```
-- ASN1START
-- TAG-NZP-CSI-RS-RESOURCESET-START
NZP-CSI-RS-ResourceSet ::=         SEQUENCE {
    nzp-CSI-ResourceSetId              NZP-CSI-RS-ResourceSetId,
    nzp-CSI-RS-Resources               SEQUENCE (SIZE (1..maxNrofNZP-CSI-RS-ResourcesPerSet)) OF NZP-CSI-RS-ResourceId,
    repetition                         ENUMERATED { on, off }          OPTIONAL,   -- Need S
    aperiodicTriggeringOffset          INTEGER(0..6)                   OPTIONAL,   -- Need S
    trs-Info                           ENUMERATED {true}               OPTIONAL,   -- Need R
    ...
}
-- TAG-NZP-CSI-RS-RESOURCESET-STOP
-- ASN1STOP
```

Fig. 8B

```
-- ASN1START
-- TAG-CSI-RESOURCECONFIG-START
CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
           nzp-CSI-RS-ResourceSetList  SEQUENCE (SIZE (1..maxNrofNZP-CSI-RS-ResourceSetsPerConfig)) OF
                                               NZP-CSI-RS-ResourceSetId                     OPTIONAL, -- Need R
           csi-SSB-ResourceSetList     SEQUENCE (SIZE (1..maxNrofCSI-SSB-ResourceSetsPerConfig)) OF CSI-SSB-ResourceSetId
                                                                                            OPTIONAL  -- Need R
        },
        csi-IM-ResourceSetList      SEQUENCE (SIZE (1..maxNrofCSI-IM-ResourceSetsPerConfig)) OF CSI-IM-ResourceSetId
    },
    bwp-Id                      BWP-Id,
    resourceType                ENUMERATED { aperiodic, semiPersistent, periodic },
    ...
}
-- TAG-CSI-RESOURCECONFIG-STOP
-- ASN1STOP
```

```
-- ASN1START
-- TAG-CSI-RESOURCEPERIODICITYANDOFFSET-START
CSI-ResourcePeriodicityAndOffset ::=    CHOICE {
    slots4                               INTEGER (0..3),
    slots5                               INTEGER (0..4),
    slots8                               INTEGER (0..7),
    slots10                              INTEGER (0..9),
    slots16                              INTEGER (0..15),
    slots20                              INTEGER (0..19),
    slots32                              INTEGER (0..31),
    slots40                              INTEGER (0..39),
    slots64                              INTEGER (0..63),
    slots80                              INTEGER (0..79),
    slots160                             INTEGER (0..159),
    slots320                             INTEGER (0..319),
    slots640                             INTEGER (0..639)
}
-- TAG-CSI-RESOURCEPERIODICITYANDOFFSET-STOP
-- ASN1STOP
```

Fig. 8E

```
-- ASN1START
-- TAG-CSI-RS-RESOURCEMAPPING-START
CSI-RS-ResourceMapping ::=          SEQUENCE {
    frequencyDomainAllocation           CHOICE {
        row1                                BIT STRING (SIZE (4)),
        row2                                BIT STRING (SIZE (12)),
        row4                                BIT STRING (SIZE (3)),
        other                               BIT STRING (SIZE (6))
    },
    nrofPorts                           ENUMERATED {p1,p2,p4,p8,p12,p16,p24,p32},
    firstOFDMSymbolInTimeDomain         INTEGER (0..13),
    firstOFDMSymbolInTimeDomain2        INTEGER (2..12)                       OPTIONAL,   -- Need R
    cdm-Type                            ENUMERATED {noCDM, fd-CDM2, cdm4-FD2-TD2, cdm8-FD2-TD4},
    density                             CHOICE {
        dot5                                ENUMERATED {evenPRBs, oddPRBs},
        one                                 NULL,
        three                               NULL,
        spare                               NULL
    },
    freqBand                            CSI-FrequencyOccupation,
    ...
}
-- TAG-CSI-RS-RESOURCEMAPPING-STOP
-- ASN1STOP
```

```
-- ASN1START
-- TAG-CSI-RS-RESOURCECONFIGMOBILITY-START
CSI-RS-ResourceConfigMobility ::=   SEQUENCE {
    subcarrierSpacing                   SubcarrierSpacing,
    csi-RS-CellList-Mobility            SEQUENCE (SIZE (1..maxNrofCSI-RS-CellsRRM)) OF CSI-RS-CellMobility,
    ... ,
    [[
    refServCellIndex-v1530              ServCellIndex    OPTIONAL    -- Need S
    ]]
}
CSI-RS-CellMobility ::=     SEQUENCE {
    cellId                      PhysCellId,
    csi-rs-MeasurementBW        SEQUENCE {
        nrofPRBs                  ENUMERATED { size24, size48, size96, size192, size264},
        startPRB                  INTEGER(0..2169)
    },
    density                      ENUMERATED {d1,d3}          OPTIONAL,   -- Need R
    csi-rs-ResourceList-Mobility SEQUENCE (SIZE (1..maxNrofCSI-RS-ResourcesRRM)) OF CSI-RS-Resource-Mobility
}
CSI-RS-Resource-Mobility ::=        SEQUENCE {
    csi-RS-Index                        CSI-RS-Index,
    slotConfig                          CHOICE {
        ms4                                 INTEGER (0..31),
        ms5                                 INTEGER (0..39),
        ms10                                INTEGER (0..79),
        ms20                                INTEGER (0..159),
        ms40                                INTEGER (0..319)
    },
    associatedSSB                       SEQUENCE {
        ssb-Index                           SSB-Index,
        isQuasiColocated                    BOOLEAN
    }                                                          OPTIONAL, -- Need R
    frequencyDomainAllocation           CHOICE {
        row1                                BIT STRING (SIZE (4)),
        row2                                BIT STRING (SIZE (12))
    },
    firstOFDMSymbolInTimeDomain         INTEGER (0..13),
    sequenceGenerationConfig            INTEGER (0..1023),
    ...
}
CSI-RS-Index ::=                    INTEGER (0..maxNrofCSI-RS-ResourcesRRM-1)
-- TAG-CSI-RS-RESOURCECONFIGMOBILITY-STOP
-- ASN1STOP
```

FIG. 9

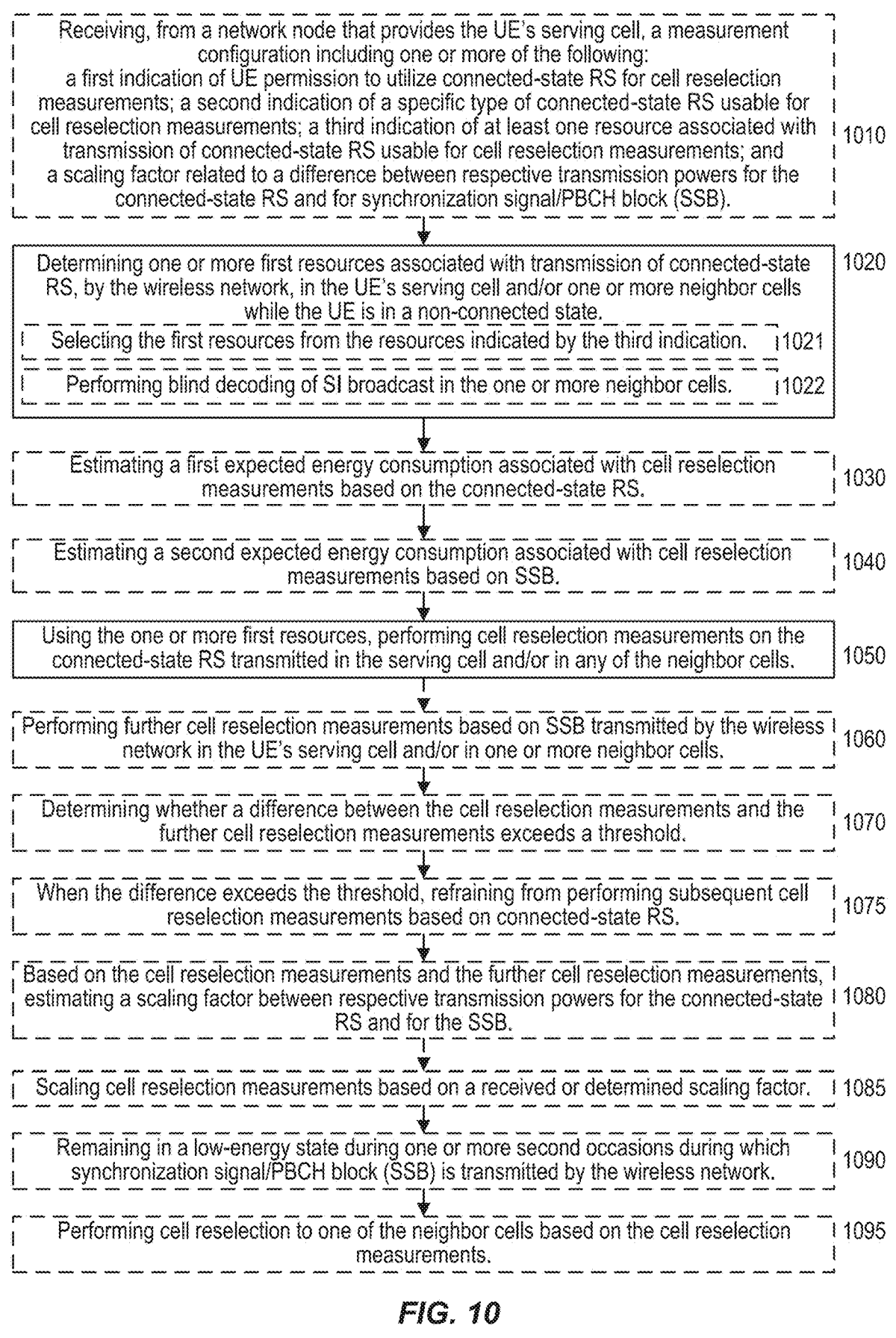

1010: Receiving, from a network node that provides the UE's serving cell, a measurement configuration including one or more of the following: a first indication of UE permission to utilize connected-state RS for cell reselection measurements; a second indication of a specific type of connected-state RS usable for cell reselection measurements; a third indication of at least one resource associated with transmission of connected-state RS usable for cell reselection measurements; and a scaling factor related to a difference between respective transmission powers for the connected-state RS and for synchronization signal/PBCH block (SSB).

1020: Determining one or more first resources associated with transmission of connected-state RS, by the wireless network, in the UE's serving cell and/or one or more neighbor cells while the UE is in a non-connected state.

1021: Selecting the first resources from the resources indicated by the third indication.

1022: Performing blind decoding of SI broadcast in the one or more neighbor cells.

1030: Estimating a first expected energy consumption associated with cell reselection measurements based on the connected-state RS.

1040: Estimating a second expected energy consumption associated with cell reselection measurements based on SSB.

1050: Using the one or more first resources, performing cell reselection measurements on the connected-state RS transmitted in the serving cell and/or in any of the neighbor cells.

1060: Performing further cell reselection measurements based on SSB transmitted by the wireless network in the UE's serving cell and/or in one or more neighbor cells.

1070: Determining whether a difference between the cell reselection measurements and the further cell reselection measurements exceeds a threshold.

1075: When the difference exceeds the threshold, refraining from performing subsequent cell reselection measurements based on connected-state RS.

1080: Based on the cell reselection measurements and the further cell reselection measurements, estimating a scaling factor between respective transmission powers for the connected-state RS and for the SSB.

1085: Scaling cell reselection measurements based on a received or determined scaling factor.

1090: Remaining in a low-energy state during one or more second occasions during which synchronization signal/PBCH block (SSB) is transmitted by the wireless network.

1095: Performing cell reselection to one of the neighbor cells based on the cell reselection measurements.

*FIG. 10*

Figure 11:
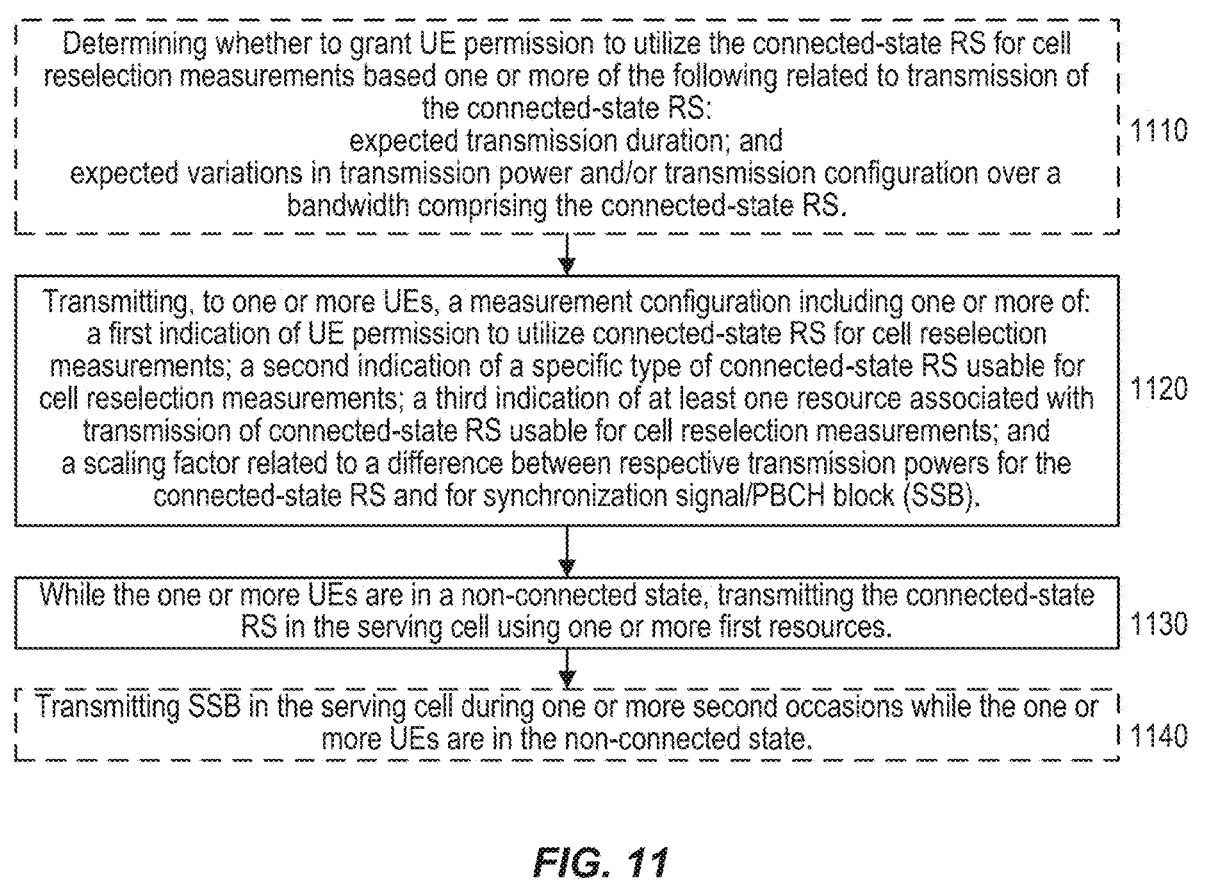

Determining whether to grant UE permission to utilize the connected-state RS for cell reselection measurements based one or more of the following related to transmission of the connected-state RS:
expected transmission duration; and
expected variations in transmission power and/or transmission configuration over a bandwidth comprising the connected-state RS.

1110

Transmitting, to one or more UEs, a measurement configuration including one or more of: a first indication of UE permission to utilize connected-state RS for cell reselection measurements; a second indication of a specific type of connected-state RS usable for cell reselection measurements; a third indication of at least one resource associated with transmission of connected-state RS usable for cell reselection measurements; and a scaling factor related to a difference between respective transmission powers for the connected-state RS and for synchronization signal/PBCH block (SSB).

1120

While the one or more UEs are in a non-connected state, transmitting the connected-state RS in the serving cell using one or more first resources.

1130

Transmitting SSB in the serving cell during one or more second occasions while the one or more UEs are in the non-connected state.

ADDITIONAL REFERENCE SIGNALS FOR UES IN NON-CONNECTED STATES

TECHNICAL FIELD

The present disclosure relates generally to wireless communication networks, and more specifically to techniques for reducing energy consumption of wireless devices operating in non-connected states in a wireless network.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or Global System for Mobile Communications (GSM) Enhanced Data rates for GSM Evolution (EDGE) Radio Access Network (GERAN), as the third-generation ("3G") and second-generation ("2G") 3GPP RANs are commonly known.

E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast, by a serving cell, performs measurements of neighbor cells to support cell reselection, and monitors a paging channel on PDCCH for pages from EPC via eNB. A UE in RRC_IDLE state is known in the EPC and has an assigned IP address, hut is not known to the serving eNB (e.g., there is no stored context).

As such, the eNB is unaware, in advance, of whether a particular UE is in a cell where the eNB is paging the UE. Typically, several UEs are assigned to the same paging occasion (PO) on the PDCCH. As a result, if is a paging message for any of the UEs listening to the same PO, all of those UEs will have to decode the contents of the PDSCH to see whether the paging message was intended for them.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and other use cases.

5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE.

In addition to providing coverage via "cells," as in LTE, NR networks also provide coverage via "beams." In general, a DL "beam" is a coverage area of a network-transmitted reference signal (RS) that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

For example, an NR UE in RRC_CONNECTED state is provided with periodic, semi-periodic, and/or aperiodic CSI-RS/TRS, which are also referred to as "tracking reference signals" (TRS) or "CSI RS for tracking." The UE uses these RS to measure channel quality and/or to adjust the UE's time and frequency synchronization with the serving network node (e.g., gNB). When the UE transitions to a non-connected state (i.e., RRC_IDLE or RRC_INACTIVE), the network may or may not turn off such RSs for that particular UE.

When camped on a cell (referred to as "serving cell") in a non-connected state (e.g., RRC_IDLE or RRC_INACTIVE), a UE regularly searches for a better cell according to various criteria. If a better cell is found that cell is selected, which may invoice a change of radio access technology (RAT), such as from LTE to NR. This process is often referred to as "cell reselection".

SUMMARY

Cell reselection measurements involve a UE calculating parameters SS-RSRP and SS-RSRQ for the serving cell and for neighbor cells. These parameters are typically calculated based on UE measurements of SSBs transmitted with a configured periodicity, e.g., every 20 ms. In general, a UE relies on SSB for cell reselection because no other DL RS are guaranteed for UEs in non-connected states. This uncertainty can cause undesirable UE behavior such as excessive energy consumption. Furthermore, configuring additional RS for cell reselection by UEs in non-connected states consumes additional DL resources that cannot be used for other purposes by the network.

Embodiments of the present disclosure provide specific improvements to communication between UEs and network nodes in a wireless network, such as by providing, enabling, and/or facilitating solutions to overcome exemplary problems summarized above and described in more detail below Embodiments include methods (e.g., procedures) for cell reselection by a UE (e.g., wireless device, IoT device, etc.) in a wireless network (e.g., E-UTRAN, NG-RAN).

These exemplary methods can include determining one or more first resources associated with transmission of connected-state reference signals (RS), by the wireless network, in the UE's serving cell and/or one or more neighbor cells while the UE is in a non-connected state. These exemplary methods can also include, using the one or more first resources, performing cell reselection measurements on the connected-state RS transmitted in the serving cell and/or in any of the neighbor cells.

In various embodiments, the cell reselection measurements performed on the connected-state RS can include any of the following: reference signal received power (RSRP); carrier received signal strength indication (RSSI); and reference signal received quality (RSRQ). In some embodiments, the cell reselection measurements can be performed on one or more of the following connected-state RS: channel state information RS (CSI-RS) for tracking, tracking RS (TRS), and CSI-RS for mobility.

In some embodiments, these exemplary methods can also include scaling the cell reselection measurements based on a scaling factor related to a difference between respective transmission powers for the connected-state RS and for synchronization signal/PBCH block (SSB). In various embodiments, the scaling factor can be received from a network node that provides the UE serving cell or can be determined by the UE.

In some embodiments, these exemplary methods can also include receiving, from a network node that provides the serving cell, a measurement configuration including one or more of the following:

- a first indication of UE permission to utilize the connected-state RS for cell reselection measurements;
- a second indication of a specific type of connected-state RS usable for cell reselection measurements;
- a third indication of at least one resource associated with transmission of connected-state RS usable for cell reselection measurements; and
- a scaling factor related to a difference between respective transmission powers for the connected-state RS and for SSB.

In some of these embodiments, the cell reselection measurements can be performed based on receiving the first indication. In some of these embodiments, the third indication can indicate a measurement window during which connected-state RS transmitted in the serving cell and the neighbor cells are usable for cell reselection measurements.

In some embodiments, the determining operations can include selecting the one or more first resources from the at least one resource indicated by the third indication. In other embodiments, the determining operations can include performing blind decoding of system information (SI) broadcast in the one or more neighbor cells to determine the one or more first resources.

In some embodiments, these exemplary methods can also include performing further cell reselection measurements based on SSB transmitted by the wireless network in the UE's serving cell and/or in one or more neighbor cells. In some of these embodiments, these exemplary methods can also include determining whether a difference between the cell reselection measurements and the further cell reselection measurements exceeds a threshold and, when the difference exceeds the threshold, refraining from performing subsequent cell reselection measurements based on connected-state RS. For example, the UE may instead perform the subsequent cell reselection measurements based on SSB.

In some of these embodiments, these exemplary methods can also include, based on the cell reselection measurements and the further cell reselection measurements, estimating a scaling factor between respective transmission powers for the connected-state RS and for the SSB, and scaling the cell reselection measurements based on the estimated scaling factor.

In some embodiments, these exemplary methods can also include estimating a first expected energy consumption associated with cell reselection measurements based on the connected-state RS, and estimating a second expected energy consumption associated with cell reselection measurements based on SSB. In such embodiments, performing cell reselection measurements on the connected-state RS is based on the first expected energy consumption being less than the second expected energy consumption.

In some embodiments, the one or more first resources used to perform the cell reselection measurements can include any of the following: time-domain resources, frequency-domain resources, code-domain resources, and one or more first occasions. In some of these embodiments, these exemplary methods can also include remaining in a low-energy state during one or more second occasions during which SSB is transmitted by the wireless network. This can be facilitated by performing the cell reselection measurements on the connected-state RS during the first occasions, such that the UE may not have to wake up to perform cell reselection measurements on SSB during the second occasions in a conventional manner.

In some of these embodiments, the UE can be preconfigured to use the connected-state RS for cell reselection measurements during the one or more first occasions.

In some embodiments, these exemplary methods can also include performing cell reselection to one of the neighbor cells based on the cell reselection measurements (i.e., performed on the connected-state RS).

Other embodiments include methods (e.g., procedures) to facilitate cell reselection by one or more UEs being served by a cell in a wireless network. These exemplary methods can be performed by a network node (e.g., base station, eNB, gNB, ng-eNB, etc., or component thereof) serving the cell in the wireless network (e.g., E-UTRAN, NG-RAN).

These exemplary methods can include transmitting, to one or more UEs, a measurement configuration including one or more of the following:

- a first indication of UE permission to utilize connected-state RS for cell reselection measurements;
- a second indication of a specific type of connected-state RS usable for cell reselection measurements;
- a third indication of at least one resource associated with transmission of connected-state RS usable for cell reselection measurements; and
- a scaling factor related to a difference between respective transmission powers for the connected-state RS and for SSB.

These exemplary methods can also include, while the one or more UEs are in a non-connected state, transmitting the connected-state RS in the serving cell using one or more first resources.

In some embodiments, the one or more first resources used to transmit the connected-state RS can be included in the at least one resource indicated by the third indication. In some embodiments, the one or more first resources used to transmit the connected-state RS include any of the following: time-domain resources, frequency-domain resources, code-domain resources, and one or more first occasions. In some of these embodiments, these exemplary methods can also include transmitting SSB in the serving cell during one or more second occasions while the one or more UEs are in the non-connected state. In such embodiments, transmitting the connected-state RS during the first occasions can facilitate the one or more UEs to remain in a low-energy state during the second occasions, thereby reducing overall UE energy consumption.

In various embodiments, the connected-state RS transmitted in the serving cell during the one or more first occasions can include any of the following: CSI-RS for tracking, TRS, and CSI-RS for mobility. In various embodiments, the cell reselection measurements can include any of the following: RSRP, RSSI, and RSRQ.

In some embodiments, these exemplary methods can also include determining whether to grant UE permission to utilize the connected-state RS for cell reselection measurements based one or more of the following related to transmission of the connected-state RS: expected transmission duration, and expected variations in transmission power and/or transmission configuration over a bandwidth comprising the connected-state RS. For example, this determination can be a basis for the first indication included in the measurement configuration.

In some embodiments, the third indication can indicate a measurement window during which connected-state RS transmitted in the serving cell and the neighbor cells are usable for cell reselection measurements.

Other embodiments include UEs (e.g., wireless devices, IoT devices, etc. or components thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can facilitate a UE to be configured with, and to utilize, connected-state RS for performing cell reselection measurements while operating in a non-connected state (e.g., RRC_IDLE or RRC_INACTIVE), such as non-SSB RS that are conventionally available only to UEs in RRC_CONNECTED state. Based on receiving such information, the UE can select appropriate RS according to various criteria, including energy consumption. For example, such flexibility enables a UE in a non-connected state to optimize sleep time and reduce energy consumption by choosing connected-state RS for cell reselection measurements instead of having to rely on non-connected state RS such as SSB.

These and other objects, features, and advantages of embodiments of the present disclosure will become apparent upon reading the following Detailed Description in view of the Drawings briefly described below.

BRIEF DESCRIPTION OF THE DRAWINGS

FIG. 8, which includes FIGS. 8A-E, shows various exemplary ASN.1 data structures for message fields and/or information elements (IEs) used to provide channel state information reference signal (CSI-RS) resource set configurations to an NR UE.

FIG. 9 shows an exemplary ASN.1 data structure for a CSI-RS-ResourceConfigMobility IE, by which an NR network can configure a UE for CSI-RS-based radio resource management (RRM) measurements.

FIG. 10 shows a flow diagram of an exemplary method for a UE (e.g., wireless device), according to various embodiments of the present disclosure.

FIG. 11 shows a flow diagram of an exemplary method for a network node (e.g., base station, eNB, gNB, ng-eNB, etc.) in a wireless network (e.g., NG-RAN, E-UTRAN), according to various embodiments of the present disclosure.

DETAILED DESCRIPTION

Figure 1:
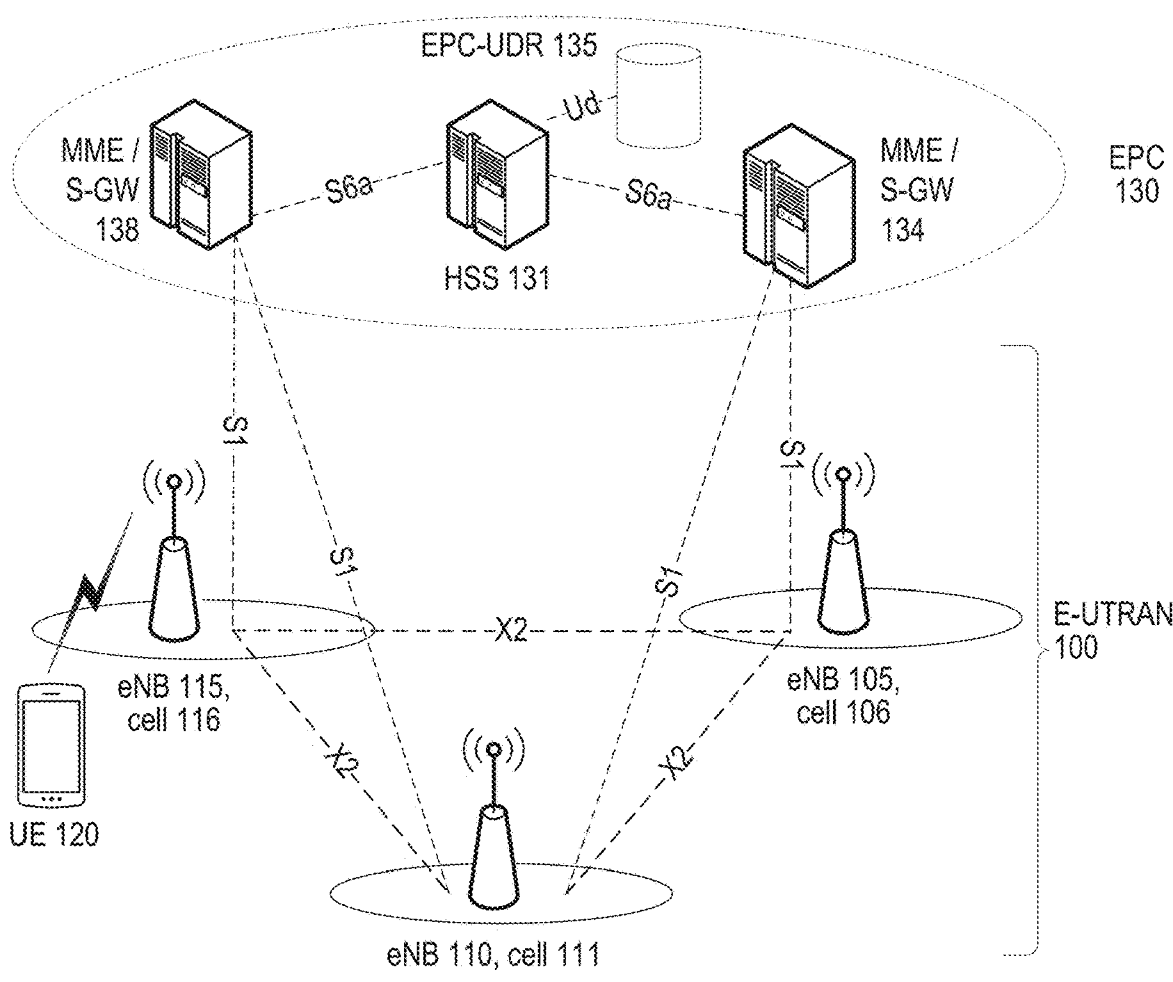
FIG. 1 shows a high-level view of an exemplary LTE network architecture.
Figure 2:
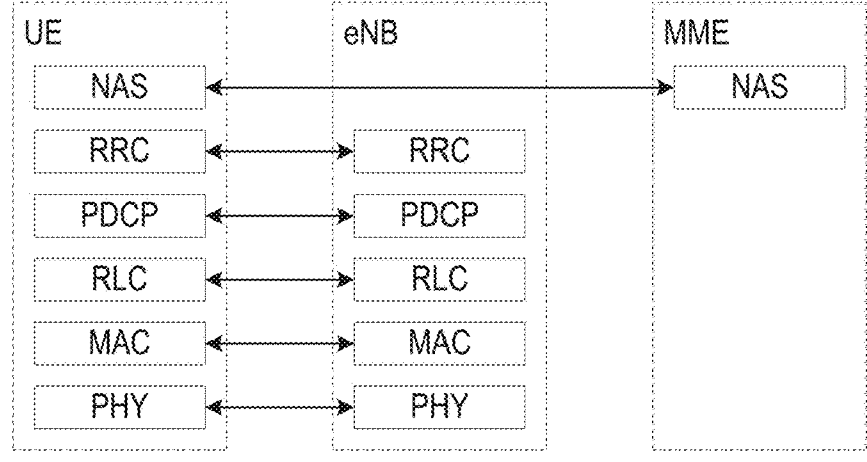
FIG. 2 shows an exemplary configuration of an LTE control plane (CP) protocol stack.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

- Radio Node: As used herein, a “radio node” can be either a “radio access node” or a “wireless device.”
- Radio Access Node: As used herein, a “radio access node” (or equivalently “radio network node,” “radio access network node,” or “RAN node”) can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.
- Core Network Node: As used herein, a “core network node” is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.
- Wireless Device: As used herein, a “wireless device” (or “WD” for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term “wireless device” is used interchangeably herein with the term “user equipment” (or “UE” for short).
- Network Node: As used herein, a “network node” is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

The description herein focuses on a 3GPP cellular communications system and, as such, 3GPP (or similar) terminology is oftentimes used. However, the principles disclosed herein are not limited to a 3GPP system. Furthermore, although the term “cell” is used herein, it should be understood that (particularly with respect to 5G NR) beams may be used instead of cells and, as such, concepts described herein apply equally to both cells and beams.

As briefly mentioned above, in NR, cell reselection measurements involve the UE calculating parameters SS-RSRP and SS-RSRQ for the serving cell as well as neighbor cells. These parameters are typically calculated based on UE measurements of SSBs transmitted with a configured periodicity, e.g., 20 ms. Currently, the UE must rely on SSB for cell reselection because no other DL RS are guaranteed for UEs in non-connected states (e.g., RRC_IDLE and RRC_INACTIVE). This uncertainty can cause undesirable UE behavior, particularly in relation to energy consumption. This is discussed in more detail below, after the following description of NR network architectures and radio interface.

Figure 3:
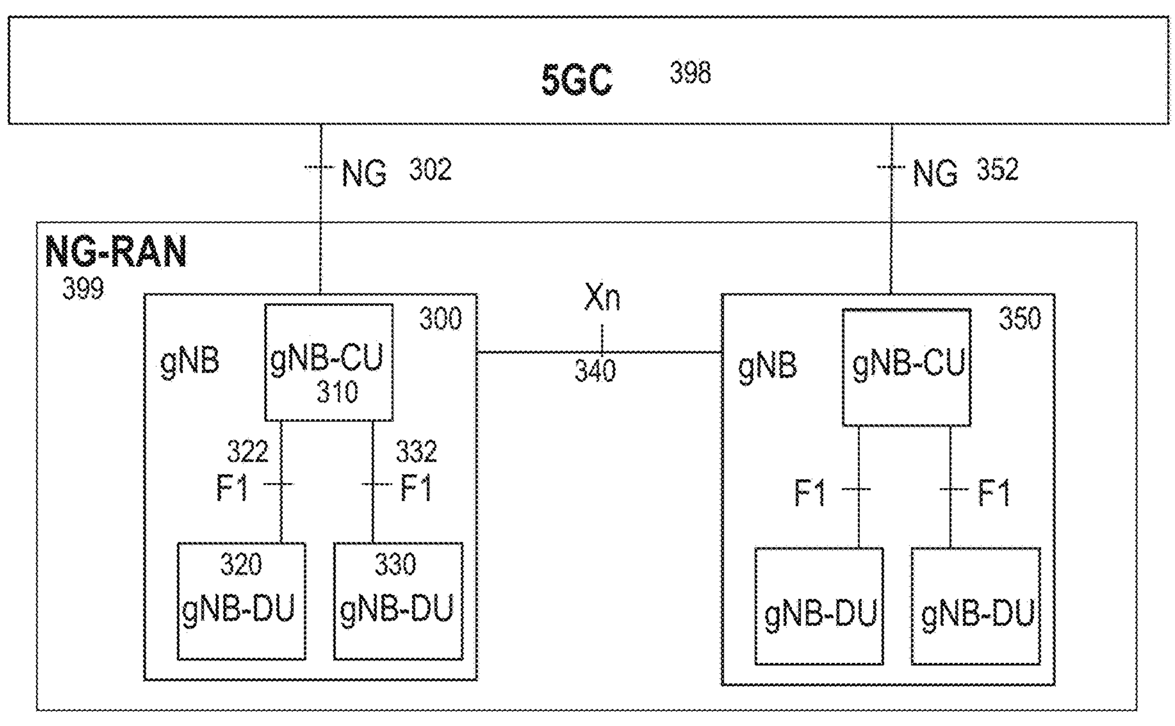
FIGS. 3-4 illustrate two high-level views of an exemplary 5G/NR network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3 GPP TS 23.501. If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
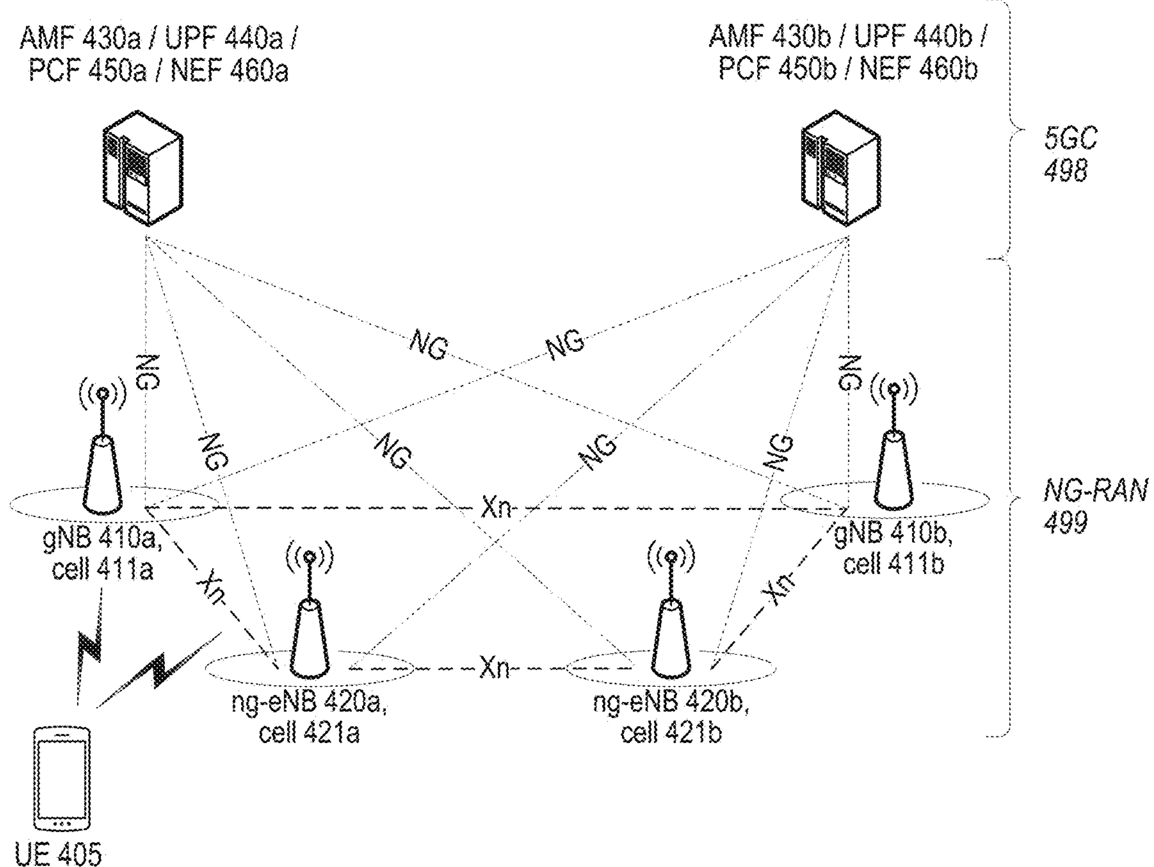

FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410*a,b*) and ng-eNBs 420 (e.g., 420*a,b*) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430*a, b*) via respective NG-C interfaces and to the UPF (User Plane Function) 440 (e.g., UPFs 440*a,b*) via respective NG-U interfaces. Moreover, the AMFs 430*a,b* can communicate with one or more policy control functions (PCFs, e.g., PCFs 450*a,b*) and network exposure functions (NEFs, e.g., NEFs 460*a,b*).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411*a-b* and 421*a-b* shown as exemplary in FIG. 4. As mentioned above, the gNBs and ng-eNBs can also use various directional beams to provide coverage in the respective cells. Depending on the particular cell in which it is located, a UE 405 can communicate with the gNB or ng-eNB serving that particular cell via the NR or LTE radio interface, respectively.

Figure 5:
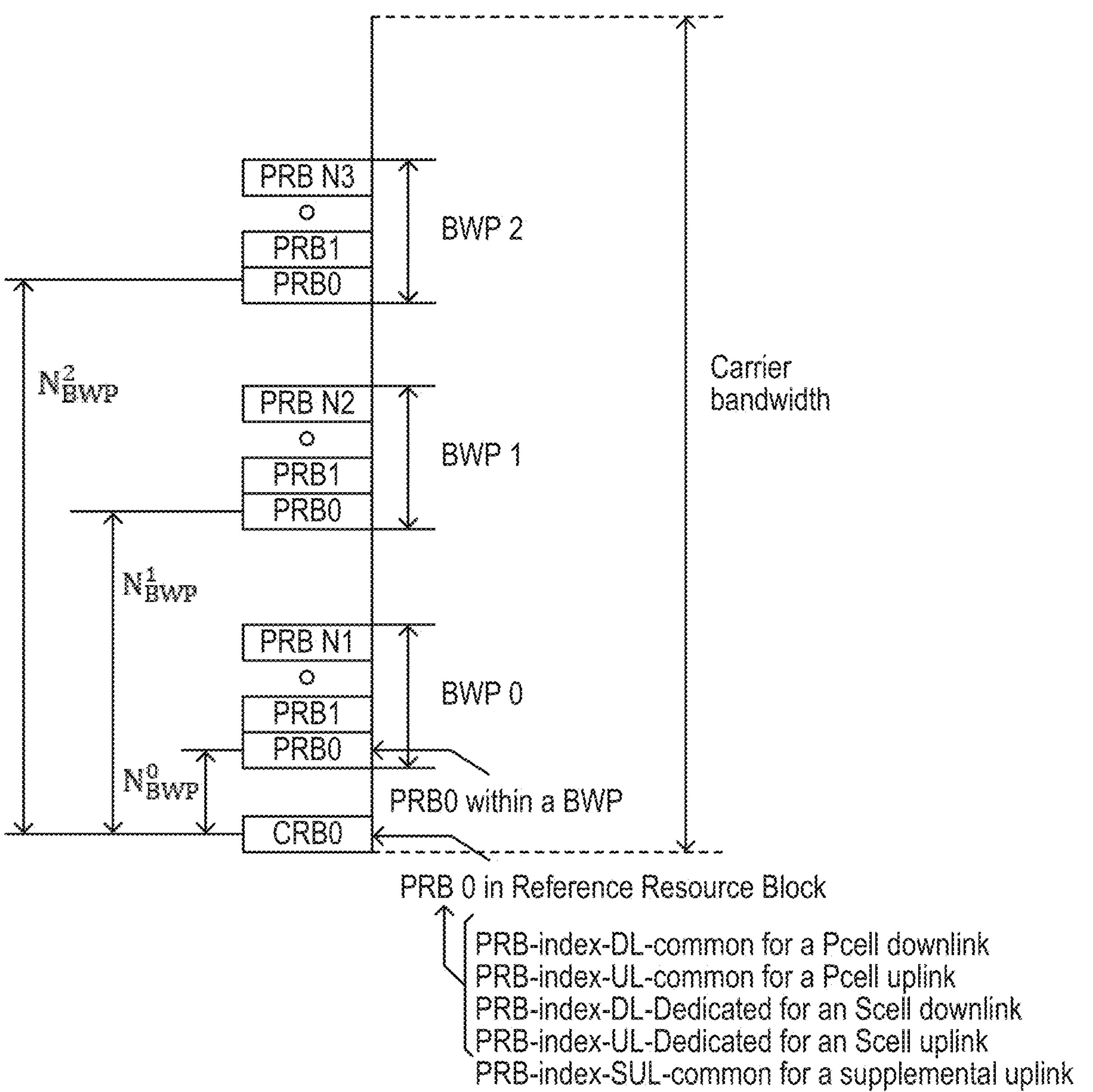
FIG. 5 shows an exemplary frequency-domain configuration for a 5G/NR UE.

FIG. 5 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 5, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 5), such that a configured BWP may start at a CRB greater than zero. CRB0 can be identified by one of the following parameters provided by the network, as further defined in 3GPP TS 38.211 section 4.4:

- PRB-index-DL-common for DL in a primary cell (PCell, e.g., PCell or PSCell);
- PRB-index-UL-common for UL in a PCell;
- PRB-index-DL-Dedicated for DL in a secondary cell (SCell);
- PRB-index-UL-Dedicated for UL in an SCell; and
- PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 5, BWPs 0-2 start at CRBs $N^0_{BWP}$, $N^1_{BWP}$, and $N^2_{BWP}$, respectively. Within a BWP, PRBs are defined and numbered in the frequency domain from 0 to $$N^{size}_{BWPi} - 1,$$

where i is the index of the particular BWP for the carrier. In the arrangement shown in FIG. 5, BWPs 0-2 include PRBs 0 to N1, N2, and N3, respectively.

Each NR resource element (RE) corresponds to one OFDM subcarrier during one OFDM symbol interval. NR supports various SCS values $\Delta f=(15\times 2^{\mu})$ kHz, where $\mu\in(0, 1, 2, 3, 4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz. Table 1 below summarizes the supported NR numerologies and associated parameters. Different DL and UL numerologies can be configured by the network.

TABLE 1

| μ | Δf = $2^{μ}$ · 15 (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 6:
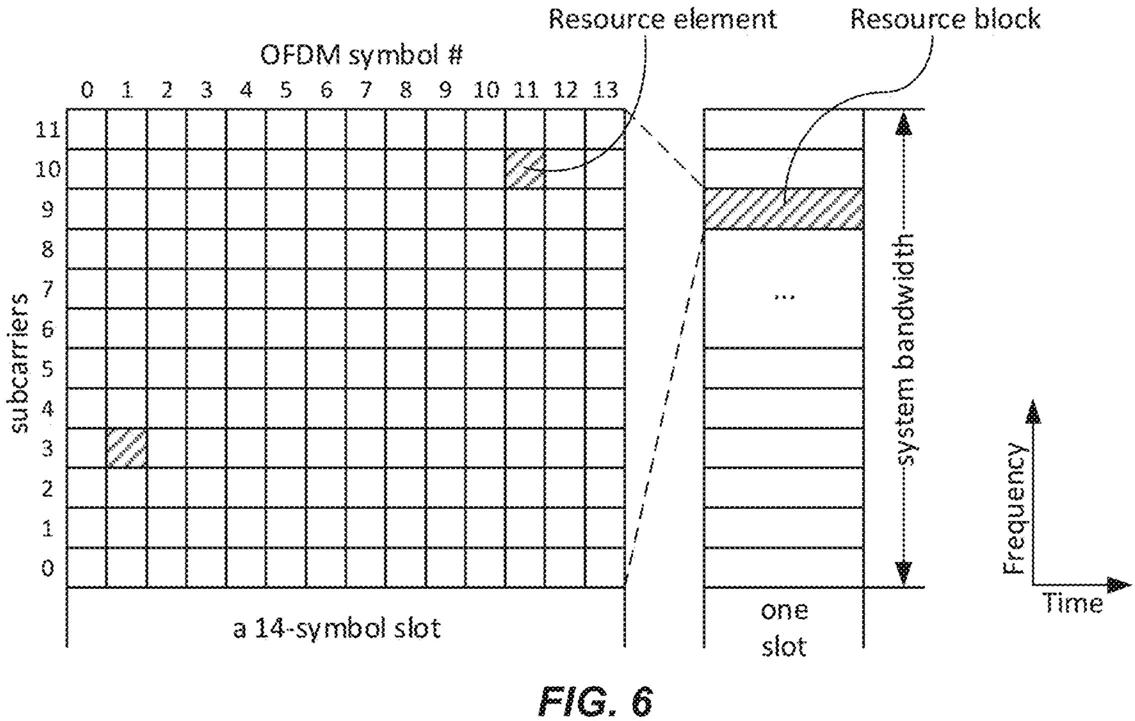
FIG. 6 shows an exemplary time-frequency resource grid for an NR slot.

FIG. 6 shows an exemplary time-frequency resource grid for an NR slot. As illustrated in FIG. 6, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

In general, an NR physical channel corresponds to a set of REs carrying information that originates from higher layers. Downlink (DL, i.e., gNB to UE) physical channels include Physical Downlink Shared Channel (PDSCH), Physical Downlink Control Channel (PDCCH), and Physical Broadcast Channel (PBCH).

PDSCH is the main physical channel used for unicast DL data transmission, but also for transmission of RAR (random access response), certain system information blocks (SIBs), and paging information. PBCH carries the basic system information (SI) required by the UE to access a cell. PDCCH is used for transmitting DL control information (DCI) including scheduling information for DL messages on PDSCH, grants for UL transmission on PUSCH, and channel quality feedback (e.g., CSI) for the UL channel.

Uplink (UL, i.e., UE to gNB) physical channels include Physical Uplink Shared Channel (PUSCH), Physical Uplink Control Channel (PUCCH), and Physical Random-Access Channel (PRACH). PUSCH is the uplink counterpart to the PDSCH. PUCCH is used by UEs to transmit uplink control information (UCI) including HARQ feedback for gNB DL transmissions, channel quality feedback (e.g., CSI) for the DL channel, scheduling requests (SRs), etc. PRACH is used for random access preamble transmission.

Within the NR DL, certain REs within each subframe are reserved for the transmission of reference signals (RS). These include demodulation reference signals (DM-RS), which are transmitted to aid the UE in the reception of an associated PDCCH or PDSCH. Other DL reference signals include positioning reference signals (PRS) and CSI reference signals (CSI-RS), the latter of which are monitored by the UE for the purpose of providing channel quality feedback (e.g., CSI) for the DL channel. Additionally, phase-tracking RS (PTRS) are used by the UE to identify common phase error (CPE) present in sub-carriers of a received DL OFDM symbol.

Other RS-like DL signals include Primary Synchronization Sequence (PSS) and Secondary Synchronization Sequence (SSS), which facilitate the UEs time and frequency synchronization and acquisition of system parameters (e.g., via PBCH). The PSS, SSS, and PBCH are collectively referred to as an SS/PBCH block (SSB).

The NR UL also includes DM-RS, which are transmitted to aid the gNB in the reception of an associated PUCCH or PUSCH, and PTRS, which are used by the gNB to identify CPE present in sub-carriers of a received UL OFDM symbol. The NR UL also includes sounding reference signals (SRS), which perform a similar function in the UL as CSI-RS in the DL.

Figure 7:
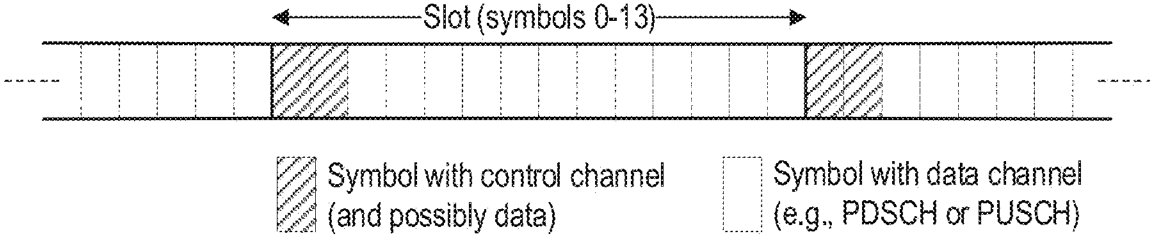
FIG. 7 shows an exemplary NR slot configuration.

FIG. 7 shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 7, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET can include one or more RBs (i.e., multiples of 12 REs) in the frequency domain and 1-3 OFDM symbols in the time domain, as further defined in 3GPP TS 38.211 § 7.3.2.2. The smallest unit used for defining CORESET is resource element group (REG), which spans one RB (i.e., 12 REs) in frequency and one OFDM symbol in time. CORESET resources can be indicated to a UE by RRC signaling. In addition to PDCCH, each REG in a CORESET contains DM-RS to aid in the estimation of the radio channel over which that REG was transmitted.

NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling. Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant.

When a UE is in RRC_IDLE or RRC_INACTIVE states, it monitors PDCCH periodically to check for scheduling of paging requests that will be transmitted on PDSCH. A paging occasion (PO) is a set of S consecutive PDCCH monitoring occasions (MOs) in which a paging DCI can he received, where S represents a number of transmitted SSBs. In other words, the $K^{th}$ PDCCH MO for paging in a PO corresponds to the $K^{th}$ transmitted SSB. A paging frame (PF) is one 10-ms radio frame and may contain zero or more POs for a UE, as explained in more detail below.

In between POs, the UE goes to sleep to reduce energy consumption. This sleep-wake cycle is known as "discontinuous reception" or DRX. The amount of UE energy savings is related to wake period ("DRX ON") duration as a fraction of the entire DRX duty cycle. Within a particular cell, the network may configure a certain number of POs per DRX cycle (e.g., during a cycle of 1.28 seconds). This information is broadcast in system information. When a UE registers with the 5GC, it is assigned a UE identity (5G-S-TMSI) that can be used by the UE and network to derive a system frame number (SFN) of the UE's assigned PF (i.e., within a DRX cycle) and assigned PO(s) within the assigned PF, based on predetermined formulas. In case the network wants to reach the UE (e.g., for incoming traffic), it pages the UE during these configured POs.

One goal of NR is to minimize always-on network transmissions that exist in earlier systems, such as LTE cell-specific reference signals (CRS). Instead, NR gNBs transmit reference signals such as SSB on a periodic basis, by default once every 20 ms. UEs in non-connected states such as RRC_IDLE and RRC_INACTIVE can use these periodic SSB for various purposes, as described below.

When camped on a cell (referred to as "serving cell") in a non-connected state (e.g., RRC_IDLE or RRC_INACTIVE), a UE regularly searches for a better cell according to various criteria. If a better cell is found that cell is selected. A change of cell cart also involve a change of radio access technology (RAT), such as from LTE to NR. This process is often referred to as "cell reselection". Cell reselection measurements involve the UE calculating parameters SS-RSRP and SS-RSRQ for the serving cell as well as neighbor cells. These parameters are typically calculated based on UE measurements of SSBs transmitted with a configured periodicity, e.g., 20 ms.

Secondary synchronization signal reference signal received power (SS-RSRP) is defined as the linear average over the power contributions (in [W]) of the SSB REs that carry the SSS. The measurement time resource(s) for SS-RSRP are confined within SSB Measurement Time Configuration (SMTC) window duration. If SS-RSRP is used for L1-RSRP as configured by reporting configurations as defined in 3GPP TS 38.214, the measurement time resources(s) restriction by SMTC window duration is not applicable. SS-RSRP is measured only on the RS corresponding to SSBs with the same SSB index and the same physical-layer cell identity (PCI).

PBCH DM-RS and, if indicated by higher layers, CSI-RS may be used for SS-RSRP measurement in addition to SSS. SS-RSRP using DM-RS and/or CSI-RS shall be measured by linear averaging over the power contributions of the REs that carry corresponding reference signals taking into account power scaling for the reference signals as defined in 3GPP TS 38.213. If SS-RSRP is not used for L1-RSRP, the additional use of CSI-RS for SS-RSRP determination is not applicable. If SS-RSRP is not used for L1-RSRP and higher layers indicate certain SSBs for SS-RSRP measurements, then SS-RSRP is measured only on the indicated SSBs.

For FR1, the reference point for the SS-RSRP shall be the antenna connector of the UE. For FR2, SS-RSRP is measured based on the combined signal from antenna elements corresponding to a given receiver branch. For FR1 and FR2, if receiver diversity is in use by the UE, the reported SS-RSRP value shall not be lower than the corresponding SS-RSRP of any individual receiver branch.

The number of REs within the measurement period that are used by the UE to determine SS-RSRP is left up to the UE implementation, provided that corresponding measurement accuracy requirements are fulfilled. The power per resource element is determined from the energy received during the useful part of the symbol, excluding the cyclic prefix (CP).

Secondary synchronization signal reference signal received quality (SS-RSRQ) is defined as the ratio (N×SS-RSRP/NR carrier RSSI), where N is the number of RBs in the NR carrier RSSI measurement bandwidth. The measurements in the numerator and denominator are made over the same set of RBs. NR carrier Received Signal Strength Indicator (NR carrier RSSI) comprises the linear average of the total received power (in [W]) observed only in certain OFDM symbols of measurement time resource(s), in the measurement bandwidth, over N number of RBs from all sources, including co-channel serving and non-serving cells, adjacent channel interference, thermal noise etc. For cell selection, the measurement time resources(s) for NR Carrier RSSI are not constrained. Otherwise, the measurement time resource(s) for NR Carrier RSSI are within the SMTC window duration.

NR Carrier RSSI is measured differently in various situations, listed below:

- If indicated by higher-layers and a measurement gap is not used, the NR Carrier RSSI is measured in slots within the SMTC window duration that are indicated by the higher layer parameter measurementSlots and in OFDM symbols given by Table 2 below (taken from 3GPP TS 38.215 Table 5.1.3-1).
- If indicated by higher-layers and a measurement gap is used, the NR Carrier RSSI is measured in slots within the SMTC window duration that are indicated by the higher layer parameter measurementSlots and in OFDM symbols given by Table 2 below that are overlapped with the measurement gap, as defined in 3GPP TS 38.133.
  - For intra-frequency measurements, NR Carrier RSSI is measured with timing reference corresponding to the serving cell in the frequency layer
  - For inter-frequency measurements, NR Carrier RSSI is measured with timing reference corresponding to any cell in the target frequency layer
- If not indicated by higher-layers and a measurement gap is not used, NR Carrier RSSI is measured from OFDM symbols within SMTC window duration and
- if not indicated by higher layers and a measurement gap is used, NR Carrier RSSI is measured from OFDM symbols corresponding to overlapped time span between SMTC window duration and the measurement gap.

TABLE 2

| OFDM signal indication endSymbol | Symbol indexes |
|---|---|
| 0 | {0,1} |
| 1 | {0,1,2, ..., 10,11} |
| 2 | {0,1,2, ..., 5} |
| 3 | {0,1,2, ..., 7} |

If higher-layers indicate certain SSBs for performing SS-RSRQ measurements, then SS-RSRQ is measured only from the indicated set of SSBs. For FR1, the reference point for SS-RSRQ measurements is the antenna connector of the UE. For FR2, NR Carrier RSSI is measured based on the combined signal from antenna elements corresponding to a given receiver branch, where the combining for NR Carrier RSSI is the same as the one used for SS-RSRP measurements. For frequency range 1 and 2, if receiver diversity is in use by the UE, the reported SS-RSRQ value shall not be lower than the corresponding SS-RSRQ of any of the individual receiver branches Both intra- and inter-frequency SS-RSRP and SS-RSRQ measurements can be used in RRC_IDLE, RRC_INAC- TIVE, and RRC_CONNECTEED modes. The UE evaluates the SS-RSRP and SS-RSRQ measurements for the serving cell against the cell selection criterion S defined in 3GPP TS 38.304 at least once every M1*N1 DRX cycle In particular, M1=2 if SMTC periodicity ($T_{SMTC}$)>20 ms and DRX cycle≤0.64 second, but otherwise M1=1.

The UE filters SS-RSRP and SS-RSRQ measurements of the serving cell using at least 2 measurements. At least two of the filtered measurements shall be spaced by at least half of a DRX cycle. If the UE determines that in $N_{serv}$ consecutive DRX cycles the serving cell does not fulfil the cell selection criterion S, the UE shall initiate the measurements of all neighbor cells indicated by the serving cell (e.g., by broadcast SI), regardless of the measurement rules currently limiting UE measurement activities. Table 3 below (taken from 3GPP TS 38.304 Table 4.2.2.2-1) gives various values for $N_{serv}$ and N1 according to DRX cycle length.

TABLE 3

| DRX cycle length [s] | Scaling Factor (N1) FR1 | Scaling Factor (N1) FR2 | $N_{serv}$ [number of DRX cycles] |
|---|---|---|---|
| 0.32 | 1 | 8 | M1*N1*4 |
| 0.64 | | 5 | M1*N1*4 |
| 1.28 | | 4 | N1*2 |
| 2.56 | | 3 | N1*2 |

If the non-connected UE has not found any new suitable cell based on searches and measurements using the intra-frequency, inter-frequency and inter-RAT information indicated in the system information for 10 s, the UE shall initiate cell selection procedures for the selected PLMN as defined in 3GPP TS 38.304.

A non-connected UE can identify new intra-frequency cells and perform SS-RSRP and SS-RSRQ measurements of the identified intra-frequency cells without an explicit intra-frequency neighbor list containing physical layer cell identities. The UE can also evaluate whether a newly detectable intra-frequency cell meets the reselection criteria defined in 3GPP TS 38.304 within $T_{detect,NR\_Intra}$ when timer Treselection=0. An intra frequency cell is considered detectable according to the conditions defined in 3GPP TS 38.304 Annex B.1.2 for a corresponding Band.

The UE measures SS-RSRP and SS-RSRQ at least every $T_{measure,NR\_Intra}$ for intra-frequency cells that are identified and measured according to the measurement rules. The UE filters SS-RSRP and SS-RSRQ measurements of each measured intra-frequency cell using at least 2 measurements. Within the set of measurements used for the filtering, at least two measurements shall be spaced by at least $T_{measure,NR\_Intra}/2$. The UE shall not consider a NR neighbor cell in cell reselection, if it is indicated as not allowed in the measurement control SI of the serving cell.

For an intra-frequency cell that has been already detected, but that has not been reselected to, the filtering shall be such that the UE shall be capable of evaluating that the intra-frequency cell has met reselection criterion defined in 3GPP TS 38.304 (v16.2.0)) within $T_{evaluate,NR\_Intra}$ when $T_{reselection}$=0 as specified in Tables 4.2.2.3-1 or 4.2.2.3-2 of that document, provided that:

- When rangeToBestCell is not configured, the cell is at least 3 dB better ranked in FR1 or 4.5 dB better ranked in FR2.
- When rangeToBestCell is configured:
  - the cell has the highest number of beams above the threshold absThreshSS-BlocksConsolidation among all detected cells whose cell-ranking criterion R value in 3GPP TS 38.304 is within rangeToBestCell of the cell-ranking criterion R value of the highest ranked cell.
  - if there are multiple such cells, the cell has the highest rank among them.
  - the cell is at least 3dB better ranked in FR1 or 4.5 dB better ranked in FR2 if the current serving cell is among them.

When evaluating cells for reselection, the SSB side conditions apply to both serving and non-serving intra-frequency cells.

If $T_{reselection}$ timer has a non-zero value and the intra-frequency cell is satisfied with the reselection criteria which are defined in 3GPP TS 38.304, the UE shall evaluate this intra-frequency cell for the $T_{reselection}$ time. If the reselection criteria remain satisfied for this cell over this duration, then the UE reselects that cell.

For UEs not configured with RRM enhancements for high speed, $T_{detect,NR\_Intra}$, $T_{measure,NR\_Intra}$ and $T_{evaluate,NR\_intra}$ are specified in 3GPP TS 38.304 (v16.2.0) Table 4.2.2.3-1. For UEs configured with RRM enhancements for high speed, $T_{detect,NR\_Intra}$, $T_{measure,NR\_Intra}$ and $T_{evaluate,NR\_intra}$ are specified in 3GPP TS 38.304 (v16.2.0) Table 4.2.2.3-2.

A non-connected UE can also identify new inter-frequency cells and perform SS-RSRP or SS-RSRQ measurements of identified inter-frequency cells if carrier frequency information is provided by the serving cell, even if no explicit neighbor list with physical layer cell identities is provided. If Srxle>$S_{nonIntraSearchP}$ and Squal>$S_{nonIntraSearchQ}$, then the UE searches for inter-frequency layers of higher priority at least every $T_{higher\_priority\_search}$ (described in 3GPP TS 38.304 section 4.2.2.7). On the other hand, if Srxlev≤$S_{nonIntraSearchP}$ or Squal≤$S_{nonIntraSearchQ}$, then the UE searches for and measures inter-frequency layers of higher, equal or lower priority in preparation for possible reselection. In this scenario, the minimum rate at which the UE is required to search for and measure higher priority layers is the same as discussed below.

A UE is not expected to meet measurement requirements for an inter-frequency carrier for DRX<320 ms in the following conditions:

- $T_{SMTC\_intra}$=$T_{SMTC\_inter}$=160 ms; where $T_{SMTC\_intra}$ and $T_{SMTC\_inter}$ are periodicities of the SMTC occasions configured for the intra-frequency carrier and the inter-frequency carrier respectively, and
- SMTC occasions configured for the inter-frequency carrier occur up to 1 ms before the start or up to 1 ms after the end of the SMTC occasions configured for the intra-frequency carrier, and
- SMTC occasions configured for the intra-frequency carrier and for the inter-frequency carrier occur up to 1 ms before the start or up to 1 ms after the end of the paging occasion in 3GPP TS 38.304 (v16.2.0).

The UE shall evaluate whether a newly detected inter-frequency cell meets the reselection criteria defined in 3GPP TS 38.304 (v16.2.0) within $K_{carrier}$*$T_{detect,NR\_Inter}$ if at least carrier frequency information is provided for inter-frequency neighbor cells by the serving cells when timer $T_{reselection}$=0. 3GPP TS 38.304 (v16.2.0) Table 4.2.2.4-1 defines various values of $T_{detect,NR\_Inter}$, $T_{measure,NR\_Inter}$ and $T_{evaluate,NR\_Inter}$ discussed above according to different DRX cycle lengths. The reselection criteria must be met by a margin of at least:

- 5 dB in FR1 or 6.5 dB in FR2 for reselections based on ranking;
- 6 dB in FR1 or 7.5 dB in FR2 for SS-RSRP reselections based on absolute priorities; or
- 4 dB in FR1 or FR2 for SS-RSRQ reselections based on absolute priorities.

The parameter $K_{carrier}$ is the number of NR inter-frequency carriers indicated by the serving cell. An inter-frequency cell is considered to be detectable according to the conditions defined in 3GPP TS 38.304 (v16.2.0) Annex B.1.3 for a corresponding band. The UE shall not consider a NR neighbor cell in cell reselection, if it is indicated as not allowed in the measurement control system information of the serving cell.

When higher-priority cells are found by the higher-priority search, the UE measures them at least every $T_{measure,NR\_Inter}$. After detecting a cell in a higher priority search, if it is determined that reselection has not occurred, then the UE is not required to continuously measure the detected cell to evaluate the ongoing possibility of reselection. However, minimum measurement filtering requirements shall still be met by the UE before it makes any determination to stop measuring the cell. If the UE detects on a NR carrier a cell whose physical identity is indicated as not allowed for that carrier in the measurement control system information of the serving cell, the UE is not required to perform measurements on that cell.

The UE measures SS-RSRP or SS-RSRQ at least every $K_{carrier}*T_{measure,NR\_Inter}$ for identified lower- or equal-priority inter-frequency cells. If the UE detects on a NR carrier a cell whose physical identity is indicated as not allowed for that carrier in the measurement control system information of the serving cell, the UE is not required to perform measurements on that cell. The UE filters SS-RSRP or SS-RSRQ measurements of each measured higher-, lower-, and equal-priority inter-frequency cell using at least 2 measurements. Within the set of measurements used for the filtering, at least two measurements shall be spaced by at least $T_{measure,NR\_Inter}/2$.

For an inter-frequency cell that has been already detected, but that has not been reselected, the filtering shall facilitate the UE to evaluate that the equal-priority inter-frequency cell has met reselection criterion defined 3GPP TS 38.304 (v16.2.0) within $K_{carrier}*T_{evaluate,NR\_Inter}$ when timer $T_{reselection}=0$ provided that:

- when rangeToBestCell is not configured, the cell is at least 5 dB better ranked in FR1 or 6.5 dB better ranked in FR2; or
- when rangeToBestCell is configured:
  - the cell has the highest number of beams above the threshold absThreshSS-BlocksConsolidation among all detected cells whose cell-ranking criterion R value in 3GPP TS 38.304 is within rangeToBestCell of the cell-ranking criterion R value of the highest ranked cell.
  - if there are multiple such cells, the cell has the highest rank among them
  - the cell is at least 5 dB better ranked in FR1 or 6.5 dB better ranked in FR2 if the current serving cell is among them, or
  - 6 dB in FR1 or 7.5 dB in FR2 for SS-RSRP reselections based on absolute priorities, or
  - 4 dB in FR1 or 4 dB in FR2 for SS-RSRQ reselections based on absolute priorities.

When evaluating cells for reselection, the SSB side conditions apply to both serving and inter-frequency cells. If timer $T_{reselection}$ has a non-zero value and the inter-frequency cell satisfies the reselection criteria, the UE shall evaluate this inter-frequency cell for a duration of $T_{reselection}$. If this cell remains satisfied with the reselection criteria within this duration, then the UE reselect that cell.

Additionally, if measured $Srxlev>S_{nonIntraSearchP}$ and measured $Squal>S_{nonIntraSearchQ}$, then the non-connected UE searches for inter-RAT E-UTRAN layers of higher priority at least every $T_{higher\_priority\_search}$ (described in 3GPP TS 38.304 section 4.2.2). On the other hand, if $Srxlev \le S_{nonIntraSearchP}$ or $Squal \le S_{nonIntraSearchQ}$, then the UE searches for and measures inter-RAT E-UTRAN layers of higher and lower priority in preparation for possible reselection. In this scenario, the minimum rate at which the UE is required to search for and measure higher priority inter-RAT E-UTRAN layers shall be the same as that defined for lower priority RATs.

These requirements apply for inter-RAT E-UTRAN FDD and TDD measurements. When the measurement rules indicate that inter-RAT E-UTRAN cells are to be measured, the UE shall measure RSRP and RSRQ of detected E-UTRA cells in the neighbor frequency list at least the specified minimum measurement rate. The parameter $N_{EUTRA\_carrier}$ is the total number of configured E-UTRA carriers indicated to meet non-high-speed requirements in the neighbor frequency list. The parameter $N_{EUTRA\_carrier\_HST}$ is the total number of configured E-UTRA carriers indicated to meet high-speed requirements in the neighbor frequency list. The UE shall filter RSRP and RSRQ measurements of each measured E-UTRA cell using at least 2 measurements. Within the set of measurements used for the filtering, at least two measurements shall be spaced by at least half the minimum specified measurement period.

An inter-RAT E-UTRA cell is considered to be detectable provided the following conditions are fulfilled:

- the same conditions as for inter-frequency RSRP measurements specified in 3GPP TS 36.133 (v16.7.0) Annex B.1.2 are fulfilled for a corresponding Band,
- the same conditions as for inter-frequency RSRQ measurements specified in 3GPP TS 36.133 (v16.7.0) Annex B.1.2 are fulfilled for a corresponding Band, and
- SCH conditions specified in 3GPP TS 36.133 (v16.7.0) Annex B.1.2 are fulfilled for a corresponding Band.

The UE evaluates whether a newly detectable inter-RAT E-UTRAN cell meets the reselection criteria defined in 3GPP TS 38.304 (v16.2.0) within $N_{EUTRA\_carrier\_HST}*T_{detect,EUTRAN\_HST}+N_{EUTRA\_carrier}*T_{detect,EUTRAN}$, when $Srxlev \le S_{nonIntraSearchP}$ or $Squal \le S_{nonIntraSearchQ}$ and timer $T_{reselection}=0$, provided that the reselection criteria is met by a margin of at least 6 dB for RSRP reselections based on absolute priorities or 4 dB for RSRQ reselections based on absolute priorities.

NR UEs in RRC_CONNECTED state can be configured by the serving gNB with a set of reference symbols for optimal link performance. For example, an NR UE in RRC_CONNECTED state can be configured by the network with one or more NZP (non-zero power) CSI-RS resource set configurations by the higher-layer (e.g., RRC) information elements (IEs) NZP-CSI-RS-Resource, NZP-CSI-RS-ResourceSet. and CSI-ResourceConfig. Exemplary ASN.1 data structures representing these IEs are shown in FIGS. 8A-C, respectively.

In addition, FIGS. 8D-E show exemplary ASN.1 data structures representing CSI-ResourcePeriodicityAndOffset and CSI-RS-ResourceMapping fields that are included in the NZP-CSI-RS-Resource IE shown in FIG. 8A. The CSI-ResourcePeriodicityAndOffset field is used to configure a periodicity and a corresponding offset for periodic and semi-persistent CSI resources, and for periodic and semi-persistent CSI reporting on PUCCH. Both periodicity and the offset are given in numbers of slots. For example, periodicity value “slots4” corresponds to four (4) slots, “slots5” corresponds to five (5) slots, etc. The CSI-RS-ResourceMapping field is used to configure the mapping of a CSI-RS resource in time and frequency domains (i.e., to REs).

FIG. 9 shows an exemplary ASN.1 data structure for an RRC CSI-RS-ResourceConfig-Mobility IE, by which an NR network can configure a UE for CSI-RS-based radio resource management (RRM) measurements. In addition, Tables 4-8 below further define various fields included in respective ASN.1 data structures shown in FIGS. 8A-C, 8E, and 9. These fields are described in more detail in the discussion following the tables.

TABLE 4

| Field Name | Description |
| --- | --- |
| periodicityAndOffset | Periodicity and slot offset sl1 corresponds to a periodicity of 1 slot, sl2 to a periodicity of two slots, and so on. The corresponding offset is also given in number of slots (see 3GPP TS 38.214 (v16.3.0) section 5.2.2.3.1). |
| powerControlOffset | Power offset of PDSCH RE to NZP CSI-RS RE. Value in dB (see 3GPP TS 38.214 (v16.3.0) sections 5.2.2.3.1 and 4.1). |
| powerControlOffsetSS | Power offset of NZP CSI-RS RE to SS RE. Value in dB (see 3GPP TS 38.214 (v16.3.0) section 5.2.2.3.1). |
| qcl-InfoPeriodicCSI-RS | For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the serving cell and to the DL BWP to which the resource belongs to (see 3GPP TS 38.214 (v16.3.0) section 5.2.2.3.1). |
| scramblingID | Scrambling ID (see 3GPP TS 38.214 (v16.3.0) section 5.2.2.3.1). |
| resource Mapping | OFDM symbol location(s) in a slot and subcarrier occupancy in a PRB of the CSI-RS resource. |
| Conditional Presence | Description |
| Periodic | The field is optionally present, Need M, for periodic NZP-CSI-RS-Resources (as indicated in CSI-ResourceConfig). The field is absent otherwise |
| PeriodicOrSemiPersistent | The field is mandatory present, Need M, for periodic and semi-persistent NZP-CSI-RS-Resources (as indicated in CSI-ResourceConfig). The field is absent otherwise. |

TABLE 5

| Field Name | Description |
| --- | --- |
| aperiodicTriggeringOffset | Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0. |
| nzp-CSI-RS-Resources | NZP-CSI-RS-Resources associated with this NZP-CSI-RS resource set (see 3GPP TS 38.214 (v16.3.0) clause 5.2). For CSI, there are at most 8 NZP CSI RS resources per resource set |
| repetition | Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see 3GPP TS 38.214 (v16.3.0) sections 5.2.2.3.1 and 5.1.6.1.2). Can only be configured for CSI-RS resource sets which are associated with CSI-ReportConfig with report of L1 RSRP or "no report" |
| trs-Info | Indicates that the antenna port for all NZP-CSI-RS resources in the CSI-RS resource set is same. If the field is absent or released the UE applies the value "false" (see 3GPP TS 38.214 (v16.3.0) section 5.2.2.3.1). |

TABLE 6

| Field Name | Description |
| --- | --- |
| bwp-Id | The DL BWP which the CSI-RS associated with this CSI-ResourceConfig are located in (see 3GPP TS 38.214 (v16.3.0) section 5.2.1.2). |
| csi-ResourceConfigId | Used in CSI-ReportConfig to refer to an instance of CSI-ResourceConfig |
| csi-RS-ResourceSetList | Contains up to maxNrofNZP-CSI-RS-ResourceSetsPerConfig resource sets if ResourceConfigType is 'aperiodic' and 1 otherwise (see 3GPP TS 38.214 (v16.3.0) section 5.2.1.2). |
| csi-SSB-ResourceSetList | List of SSB resources used for beam measurement and reporting in a resource set (see 3GPP TS 38.214(v16.3.0)). |

TABLE 6-continued

| Field Name | Description |
|---|---|
| resourceType | Time domain behavior of resource configuration (see 3GPP TS 38.214 (v16.3.0) section 5.2.1.2). It does not apply to resources provided in the csi-SSB-ResourceSetList. |

TABLE 7

| Field Name | Description |
|---|---|
| cdm-Type | Code division multiplexing (CDM) type (see 3GPP TS 38.214 (v16.3.0) section 5.2.2.3.1). |
| density | Density of CSI-RS resource measured in RE/port/PRB (see TS 38.211 [16], clause 7.4.1.5.3). Values 0.5 (dot5), 1 (one) and 3 (three) are allowed for X = 1, values 0.5 (dot5) and 1 (one) are allowed for X = 2, 16, 24 and 32, value 1 (one) is allowed for X = 4, 8, 12. For density = 1/2, includes 1-bit indication for RB level comb offset indicating whether odd or even RBs are occupied by CSI-RS. |
| firstOFDMSymbolIn-TimeDomain2 | Time domain allocation within a physical resource block. See 3GPP TS 38.211 (v16.3.0) section 7.4.1.5.3. |
| firstOFDMSymbolIn-TimeDomain | Time domain allocation within a physical resource block. The field indicates the first OFDM symbol in the PRB used for CSI-RS. See TS 38.211 (v16.3.0) section 7.4.1.5.3. Value 2 is supported only when DL-DMRS-typeA-pos equals 3. |
| freqBand | Wideband or partial band CSI-RS, (see 3GPP TS 38.214 (v16.3.0) section 5.2.2.3.1) |
| frequencyDomain-Allocation | Frequency domain allocation within a physical resource block in accordance with 38.211 (v16.3.0) section 7.4.1.5.3. The applicable row number in table 7.4.1.5.3-1 is determined by the frequencyDomain Allocation for rows 1, 2 and 4, and for other rows by matching the values in the column Ports, Density and CDMtype in table 7.4.1.5.3-1 with the values of nrofPorts, cdm-Type and density below and, when more than one row has the 3 values matching, by selecting the row where the column (k bar, 1 bar) in table 7.4.1.5.3-1 has indexes for k ranging from 0 to 2*n-1 where n is the number of bits set to 1 in frequencyDomainAllocation. |
| nrofPorts | Number of ports (see 3GPP TS 38.214 (v16.3.0) section 5.2.2.3.1) |

TABLE 8

| Field Name | Description |
|---|---|
| csi-rs-ResourceList-Mobility | List of CSI-RS resources for mobility. The maximum number of CSI-RS resources that can be configured per frequency layer depends on the configuration of associatedSSB (see 3GPP TS 38.214 38.211 (v16.3.0) section 5.1.6.1.3). |
| density | Frequency domain density for the 1-port CSI-RS for L3 mobility Corresponds to L1 parameter 'Density'. |
| nrofPRBs | Allowed size of the measurement BW in PRBs Corresponds to L1 parameter 'CSI-RS-measurementBW-size'. |
| startPRB | Starting PRB index of the measurement bandwidth Corresponds to L1 parameter 'CSI-RS-measurement-BW-start' (see FFS_Spec, section FFS_Section) FFS_Value: Upper edge of value range unclear in RAN1. |
| csi-RS-CellList-Mobility | List of cells |
| refServCellIndex | Indicates the serving cell providing the timing reference for CSI-RS resources without associatedSSB. The field may be present only if there is at least one CSI-RS resource configured without associatedSSB. In case there is at least one CSI-RS resource configured without associatedSSB and this field is absent, the UE shall use the timing of the PCell. The CSI-RS resources and the serving cell indicated by refServCellIndex for timing reference should be located in the same band. |
| subcarrierSpacing | Subcarrier spacing of CSI-RS. Only the values 15, 30 or 60 kHz (<6 GHz), 60 or 120 kHz (>6 GHz) are applicable. |
| associatedSSB | If this field is present, the UE may base the timing of the CSI-RS resource indicated in CSI-RS-Resource-Mobility on the timing of the cell indicated by the cellId in the CSI-RS-CellMobility. In this case, the UE is not required to monitor that CSI-RS resource if the UE cannot detect the SS/PBCH block indicated by this associatedSSB and cellId. If this field is absent, the UE shall base the timing of the CSI-RS resource indicated in CSI-RS-Resource-Mobility on the timing of the serving cell indicated by refServCellIndex. In this case, the UE is |

TABLE 8-continued

| Field Name | Description |
|---|---|
| | required to measure the CSI-RS resource even if SS/PBCH block(s) with cellId in the CSI-RS-CellMobility are not detected. CSI-RS resources with and without associatedSSB may be configured in accordance with the rules in 3GPP TS 38.214 (v16.3.0) section 5.1.6.1.3. |
| csi-RS-Index | CSI-RS resource index associated to the CSI-RS resource to be measured (and used for reporting). |
| firstOFDMSymbol-InTimeDomain | Time domain allocation within a physical resource block. The field indicates the first OFDM symbol in the PRB used for CSI-RS, see 3GPP TS 38.211 (v16.3.0) section 7.4.1.5.3. Value 2 is supported only when DL-DMRS-typeA-pos equals 3. |
| frequencyDomain-Allocation | Frequency domain allocation within a physical resource block in accordance with 3GPP TS 38.211 (v16.3.0) section 7.4.1.5.3 including table 7.4.1.5.2-1. The number of bits that may be set to one depend on the chosen row in that table. For the choice "other", the row can be determined from the parameters below and from the number of bits set to 1 in frequencyDomainAllocation. |
| isQuasiColocated | The CSI-RS resource is either QCL'd not QCL'd with the associated SSB in spatial parameters (see 3GPP TS 38.214 (v16.3.0) section 5.1.6.1.3. |
| sequenceGeneration-Config | Scrambling ID for CSI-RS (see 3GPP TS 38.211 (v16.3.0) section 7.4.1.5.2). |
| slotConfig | Indicates the CSI-RS periodicity (in milliseconds) and for each periodicity the offset (in number of slots). When subcarrierSpacingCSI-RS is set to 15 kHZ, the maximum offset values for periodicities ms 4/ms 5/ms 10/ms 20/ms 40 are 3/4/9/19/39 slots. When subcarrierSpacingCSI-RS is set to 30 kHZ, the maximum offset values for periodicities ms 4/ms 5/ms 10/ms 20/ms 40 are 7/9/19/39/79 slots. When subcarrierSpacingCSI-RS is set to 60 kHZ, the maximum offset values for periodicities ms4/ms5/ms10/ms20/ms40 are 15/19/39/79/159 slots. When subcarrierSpacingCSI-RS is set 120 kHZ, the maximum offset values for periodicities ms 4/ms 5/ms 10/ms 20/ms 40 are 31/39/79/159/319 slots. |

Each NZP CSI-RS resource set consists of K≥1 NZP CSI-RS resources. The following parameters are included in the RRC IEs NZP-CSI-RS-Resource, CSI-ResourceConfig, and NZP-CSI-RS-ResourceSet for each CSI-RS resource configuration:

- nzp-CSI-RS-ResourceId determines CSI-RS resource configuration identity. This identifier can have any value from zero up to one less than the maximum number of configured NZP CSI-RS resources (maxNrofNZP-CSI-RS-Resources).
- nzp-CSI-RS-ResourceSetId determines CSI-RS resource set configuration identity. This identifier can have any value from zero up to one less than the maximum number of configured NZP CSI-RS resource sets (maxNrofNZP-CSI-RS-ResourceSets).
- CSI-RS-ResourceConfigId is used to identify a specific CSI-ResourceConfig. This identifier can have any value from zero up to one less than the maximum number of CSI-RS resource configurations (maxNrofCSI-RS-Resource Configurations).
- periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.
- resourceMapping defines the number of ports, CDM-type, and OFDM symbol and subcarrier occupancy of the CSI-RS resource within a slot that are given in 3GPP TS 38.211 clause 7.4.1.5.
- nrofPorts in resourceMapping defines the number of CSI-RS ports, where the allowable values are given in 3GPP TS 38.211 (v16.3.0) section 7.4.1.5.
- density in resourceMapping defines CSI-RS frequency density of each CSI-RS port per PRB, and CSI-RS PRB offset in case of the density value of ½, where the allowable values are given in 3GPP TS 38.211 (v16.3.0) 7.4.1.5. For density ½, the odd/even PRB allocation indicated in density is with respect to the common resource block grid.
- cdm-Type in resourceMapping defines CDM values and pattern, where the allowable values are given in 3GPP TS 38.211 (v16.3.0) 7.4.1.5.
- powerControlOffset: the assumed ratio of PDSCH EPRE to NZP CSI-RS EPRE when UE derives CSI feedback and takes values in the range of [−8, 15] dB with 1 dB step size.
- powerControlOffsetSS: the assumed ratio of NZP CSI-RS EPRE to SS/PBCH block EPRE.
- scramblingID defines scrambling ID of CSI-RS with length of 10 bits.
- BWP-Id in CSI-ResourceConfig defines which bandwidth part the configured CSI-RS is located in.
- repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in 3GPP TS 38.211 (v16.3.0) 5.1.6.1.2. and can be configured only when the higher layer parameter reportQuantity associated with all the reporting settings linked with the CSI-RS resource set is set to 'cri-RSRP', 'cri-SINR' or 'none'.
- qcl-InfoPeriodicCSI-RS contains a reference to a TCI-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP.

trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same as described in 3GPP TS 38.211 (v16.3.0) 5.1.6.1.1 and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement. Furthermore, the UE expects that all the CSI-RS resources of a resource set are configured with the same starting RB and number of RBs and the same cdm-type.

The bandwidth and initial common resource block (CRB) index of a CSI-RS resource within a BWP, as defined in 3GPP TS 38.211 (v16.3.0) 7.4.1.5, are determined based on the RRC-configured parameters nrofPRBs and startingPRB, respectively, within the CSI-FrequencyOccupation IE configured by the RRC parameter freqBand within the CSI-RS-ResourceMapping IE. Both nrofPRBs and startingPRB are configured as integer multiples of four (4) RBs, and the reference point for startingPRB is CRB 0 on the common resource block grid. If starting $$RB < N_{BWP}^{start},$$

the UE shall assume that the initial CRB index of the CSI-RS resource is $$N_{initial\,RB} = N_{BWP}^{start},$$

otherwise $N_{initial\ RB}$=startingRB. If $$nrofRBs > N_{BWP}^{size} + N_{BWP}^{start} - N_{initial\,RB},$$

the UE assumes that the bandwidth of the CSI-RS resource is $$N_{CSI-RS}^{BW} = N_{BWP}^{size} + N_{BWP}^{start} - N_{initial\,RB}.$$

Otherwise, the UE assumes that $$N_{CSI-RS}^{BW} = nrofRBs.$$

In all cases, the UE expects that $$N_{CSI-RS}^{BW} \geq \min(24, N_{BWP}^{size}).$$

A UE in RRC_CONNECTED state receives from the network (e.g., via RRC) a UE-specific configuration of a NZP-CSI-RS-ResourceSet including the parameter trs-Info, described in the parameter list above. For NZP-CSI-RS-ResourceSet configured with the RRC parameter trs-Info set to "true", the UE shall assume the antenna port with the same port index of the configured NZP CSI-RS resources in the NZP-CSI-RS-ResourceSet is the same.

For frequency range 1 (FR1, e.g., sub-6 GHz), the UE may be configured with one or more NZP CSI-RS sets, where a NZP-CSI-RS-ResourceSet consists of four periodic NZP CSI-RS resources in two consecutive slots with two periodic NZP CSI-RS resources in each slot. If no two consecutive slots are indicated as DL slots by tdd-UL-DL-ConfigurationCommon or tdd-UL-DL-ConfigDedicated, then the UE may be configured with one or more NZP CSI-RS sets, where a NZP-CSI-RS-ResourceSet consists of two periodic NZP CSI-RS resources in one slot.

For frequency range 2 (FR2, e.g., above 6 GHz), the UE may be configured with one or more NZP CSI-RS sets, where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

In addition, a UE configured with NZP-CSI-RS-ResourceSet(s) including parameter trs-Info may have the CSI-RS resources configured as periodic, with all CSI-RS resources in the NZP-CSI-RS-ResourceSet configured with same periodicity, bandwidth and subcarrier location. As a second option, a UE configured with NZP-CSI-RS-ResourceSet(s) including parameter trs-Info may be configured with periodic CSI-RS resource in one set and aperiodic CSI-RS resources in a second set, with the aperiodic CSI-RS and periodic CSI-RS resource having the same bandwidth (with same RB location) and the aperiodic CSI-RS being "QCL-Type-A" and "QCL-TypeD" (where applicable) with respect to the periodic CSI-RS resources.

In this second option, for FR2, the UE expects that the scheduling offset between the last symbol of the PDCCH carrying the triggering DCI and the first symbol of the aperiodic CSI-RS resources is not smaller than the UE reported ThresholdSched-Offset. The UE shall expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggeringOffset indicates the triggering offset for the first slot for the first two CSI-RS resources in the set.

In addition, the UE expects not to be configured with any of the following:

a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured';

a CSI-ReportConfig with the higher layer parameter reportQuantity set to other than 'none' for aperiodic NZP CSI-RS resource set configured with trs-Info;

a CSI-ReportConfig for periodic NZP CSI-RS resource set configured with trs-Info; or a NZP-CSI-RS-ResourceSet configured both with trs-Info and repetition.

In addition, according to 3GPP TS 38.211 clause 7.4.1.5.3, each CSI-RS resource is configured by the higher layer parameter NZP-CSI-RS-Resource with the following restrictions:

the time-domain locations of the two CSI-RS resources in a slot, or of the four CSI-RS resources in two consecutive slots (which are the same across two consecutive slots), as defined by higher layer parameter CSI-RS-resourceMapping, is given by:

$l \in \{4, 8\}$, $l \in \{5, 9\}$, or $l \in \{6, 10\}$ for FR1 and FR2; or $l \in \{0, 4\}$, $l \in \{1, 5\}$, $l \in \{2, 6\}$, $l \in \{3, 7\}$, $l \in \{7, 11\}$, $l \in \{8, 12\}$ or $l \in \{9, 13\}$ for FR2.

a single port CSI-RS resource with density ρ=3 given by 3GPP TS 38.211 Table 7.4.1.5.3-1 and parameter density configured by CSI-RS-ResourceMapping.

the bandwidth of the CSI-RS resource, as given by the parameter freqBand configured by CSI-RS-ResourceMapping, is the minimum of 52 and $$N_{BWP,i}^{size}\ RBs,$$

or is equal to $$N_{BWP,i}^{size}\ RBs.$$

For operation with shared spectrum channel access, freqBand configured by CSI-RS-ResourceMapping, is the minimum of 48 and $$N_{BWP,i}^{size}\ RBs,$$

or is equal to $$N_{BWP,i}^{size}\ RBs.$$

the UE is not expected to be configured with the periodicity of $2^{\mu \times 10}$ slots if the bandwidth of CSI-RS resource is larger than 52 RBs.

the periodicity and slot offset for periodic NZP CSI-RS resources, as given by the parameter periodicityAndOffset configured by NZP-CSI-RS-Resource, is one of $2^{\mu}X_p$slots where $X_p$=10, 20, 40, or 80 and where μ is the numerology of the BWP.

same powerControlOffset and powerControlOffsetSS given by NZP-CSI-RS-Resource value across all resources.

Once configured with periodic, semi-periodic, and/or aperiodic CSI-RS/TRS (also referred to as "tracking reference signals", "TRS", or "CSI RS for tracking") in the manner described above, an NR UE in RRC_CONNECTED state uses these RS to measure channel quality and/or to adjust the UE's time and frequency synchronization with the UE's serving network node (e.g., gNB). When the UE transitions to a non-connected state (e.g., RRC_IDLE, RRC_INACTIVE, or a state with similar properties), the network may or may not turn off TRS that were available to the UE in RRC_CONNECTED state. As such, the non-connected UE is not aware of whether the connected-state RS are also available in the non-connected state.

As used herein, a "connected-state RS" is a RS that is transmitted at various occasions by the network but is conventionally and/or normally available for use only by UEs in RRC_CONNECTED state (or a state with similar properties) with an active connection to the network. In other words, in conventional operation, a connected-state RS is not available to a UE while the UE is in a non-connected state (e.g., RRC_IDLE, RRC_INACTIVE, or a state with similar properties) without an active connection to the network. Examples of connected-state RS include CSI-RS, TRS, etc.

In the present disclosure, the terms "presence," "activated," and "available" are used synonymously with respect to connected-state RS; likewise, the terms "absence," "deactivated," and "unavailable" are used synonymously. Also, the term "additional RS" is used synonymously with "connected-state RS" (defined above), at least with respect to non-connected-state UEs.

UEs operating in the connected state can utilize such RS for various purposes, such as radio link monitoring (RLM), tracking, etc. Examples of connected-state RS include CSI-RS, TRS, etc. In conventional operation, however, a connected-state RS is unavailable to a UE while the UE is in a non-connected state (e.g., RRC_IDLE, RRC_INACTIVE, or a state with similar properties) without an active connection to the network. In particular, even when the network is transmitting the connected-state RS, they may be unavailable to the non-connected-state UEs because such UEs are unaware of the presence and/or configuration of the connected-state RS being transmitted by the network.

There have been discussions in 3GPP about NG-RAN indicating potential occasions of TRS to non-connected UEs, whereby UEs can utilize the TRS to reduce energy consumption. These discussions have focused on using TRS (instead of SSB) for automatic gain control (AGC) and time/frequency corrections. However, UEs in non-connected states also consume energy due to other operations such as radio resource management (RRM) measurements for the serving cell and neighbor cell, including the cell reselection measurements discussed above.

Thus, it would be desirable to utilize available connected-state RS for cell reselection purposes to reduce UE energy consumption while in non-connected states. However, current 3GPP specifications do not allow the UE to perform the underlying SS-RSRP and SS-RSRQ measurements on connected-state RS at least while in non-connected states. Thus, techniques are needed to facilitate a UE, once informed about availability of connected-state RS in a non-connected state, to perform cell reselection measurements based on the connected-state RS.

Accordingly, embodiments of the present disclosure provide flexible and efficient techniques that enable and/or facilitate a UE to be configured with, and utilize, connected-state RS to be used for performing cell reselection measurements, such as SS-RSRP and SS-RSRQ, while operating in a non-connected state. However, such techniques may also be applicable to UEs operating in a connected state.

Such embodiments can provide various benefits and/or advantages. For example, providing UEs with additional RSs for cell reselection measurements facilitate increased UE flexibility in choosing appropriate RS according to various criteria, including energy consumption. In particular, such flexibility enables a UE in non-connected state to optimize sleep time and reduce energy consumption by choosing connected-state RS for cell reselection measurements. In other words, a UE does not have to remain awake to receive non-connected-state RS (e.g., SSB) to use for similar purposes. Furthermore, embodiments can provide such advantages without requiring additional types of reference signals than what the network already transmits to UEs in RRC_CONNECTED state (e.g., TRS/CSI-RS for tracking).

In the following description, it is assumed that the UE is aware of connected-state RS transmissions and/or configurations in the serving cell and neighbor cells to be measured, while operating in both connected and non-connected states. The UE can be provided this information in various ways, such as disclosed in U.S. App. 62/976,415 by the present Applicant. Given this information, the UE employs the connected-state RS for cell reselection measurements and the calculation of SS-RSRP and SS-RSRQ for the serving cell and/or the neighbor cells.

Some of the examples described herein refer to an "occasion" (e.g., "first occasion") during which connected-state RS are transmitted by the wireless network such that, upon determining these occasions, the UE can perform cell reselection measurements on these connected-state RS. An "occasion" is an example of a resource, which in various embodiments can also be time-domain, frequency-domain, and/or code-domain. Examples of such resources are discussed above in relation to FIGS. 8-9.

In some embodiments, the UE may be configured (or pre-configured) to use connected-state RS for calculation of SS-RSRP but not SS-RSRQ. In other embodiments, the UE may be configured (or pre-configured) to use connected-state RS for calculation of NR carrier RSSI (as part of SS-RSRQ) but not SS-RSRP. As such, the particular embodiments regarding SS-RSRP and SS-RSRQ can be used independently but also in combination.

In general, "pre-configured" (or "pre-configuration") refers to something that is part of a 3PP specifications (e.g., a table including indices referring to some specific configurations). In contrast, "configured" (or "configuration") refers to something that can be given values by signaling from the network, e.g., RRC.

In some embodiments, the UE can be pre-configured such that if connected-state RS are available, the UE can employ them for SS-RSRP measurements. For example, current 3GPP specifications can be modified such UEs are allowed to use connected-state RS for SS-RSRP calculation if they are available and/or transmitted. In other embodiments, the UE can be explicitly informed (e.g., via RRC signaling) about which connected-state RS occasions can be employed for SS-RSRP calculations.

In some embodiments, the UE may utilize power scaling between the connected-state RS and SSB in order to accurately calculate SS-RSRP based on connected-state RS. The UE can obtain scaling/offset information in advance (e.g., via RRC, broadcast SI, measurements, etc.) and then utilize it to scale measurements based on connected-state RS for consistency with SSS-based measurements. For example, a connected-state RS may be transmitted with a non-zero power offset with respect to SSS, and thus it is important to consider this offset to obtain accurate and/or reliable SS-RSRP measurements.

In some embodiments, the UE can determine the necessary power scaling based on respective measurements based on SSB and connected-state RS. For example, the UE may compute a first estimate of SS-RSRP based on SSB and a second estimate based on connected-state RS during one or more measurement occasions. Optionally, the UE may make compute first and second estimates over multiple measurement occasions, and filter/average the first estimates and the second estimates to obtain less noisy and/or more reliable first and second estimates. The UE can then compare the filtered or unfiltered estimates to determine an appropriate power scaling between the two types of SS-RSRP estimates.

In other embodiments, the UE can be provided with the power scaling between SSB and relevant connected-state RS by the network, e.g. in broadcast SI, dedicated RRC message, or a combination thereof. For example, the power scaling can be signaled together with the connected-state RS configuration provided to UEs operating in a non-connected state.

In some embodiments, the network can explicitly configure a UE to utilize connected-state RS for SS-RSRP calculation. For example, as part of the connected-state RS configuration, the network can include a parameter indicating whether the UE is permitted to utilize available connected-state RS for SS-RSRP calculations. The network may determine whether to grant such permission based on various parameters associated with the connected-state RS transmissions, such as expected on-time or duration, expected variations in power or configuration over a component carrier (CC) bandwidth, etc. As another example, the network can indicate permission for a non-connected UE to utilize connected-state RS for SS-RSRP calculation together with the indication of potential connected-state RS occasions to the non-connected UE.

In case the network does not explicitly grant or deny permission for the UE to utilize connected-state RS for SS-RSRP calculation, the UE can assume that it is not granted permission and rely on SSB for SS-RSRP calculation, as in legacy procedures. Alternately, the UE can assume that it is implicitly granted permission to use available connected-state RS for SS-RSRP calculation.

In some embodiments, the network can configure the UE to utilize a specific type of connected-state RS and/or specific symbols within the connected-state RS, for SS-RSRP calculation. The configuration can be done via RRC signaling, for example. As a specific example, the network can indicate via RRC signaling that the UE can use connected-state for SS-RSRP calculation, but the specific symbols within the connected-state RS can be pre-configured, e.g., in a 3GPP specification.

To determine SS-RSRQ based on connected-state RS, the UE should determine SS-RSRP and/or NR carrier RSSI based on measurements of connected-state RS. For reliable results, the UE preferably makes both measurements on the same set of REs. The UE can determine SS-RSRP in any manner discussed above. The following discloses various techniques whereby the UE can determine NR carrier RSSI based on connected-state RS measurements.

According to current 3GPP TS 38.211 section 4.1, the measurement time resources(s) for NR Carrier RSSI are not constrained when calculating SS-RSRQ for cell selection. For cell reselection and other RRM measurements, the measurement time resource(s) for NR Carrier RSSI are confined within the SSB Measurement Time Configuration (SMTC) window duration and potentially specific OFDM symbols if indicated by higher layers. Therefore, according to the current specification, the UE cannot employ connected-state RS for calculating NR carrier RSSI for cell reselection measurement.

In some embodiments, the UE can be pre-configured to utilize connected-state RS, a specific type of connected-state RS (e.g., if TRS spans over two consecutive slots), and/or specific symbols within the connected-state RS, to calculate NR carrier RSSI. For example, the current specifications can be adapted to allow the UE to employ available connected-state RS for NR carrier RSSI calculations. In some cases, the 3GPP specifications can also be adapted to indicate specific types of connected-state RS and/or symbols within the connected-state RS that can be used for NR carrier RSSI calculations.

In other embodiments, the network can configure the UE to utilize connected-state RS, a specific type of connected-state RS (e.g., if TRS spans over two consecutive slots), and/or specific symbols within the connected-state RS, to calculate NR carrier RSSI. The configuration can be done via RRC signaling, for example. As a specific example, the network can indicate via RRC signaling that the UE can use connected-state RS to calculate NR carrier RSSI, but the specific symbols within the connected-state RS can be pre-configured, e.g., in a 3GPP specification.

As another example, as part of the connected-state RS configuration, the network can include a parameter indicating whether the UE is permitted to utilize available connected-state RS for NR carrier RSSI calculations. The network may determine whether to grant such permission based on various parameters associated with the connected-state RS transmissions, such as expected on-time or duration, expected variations in power or configuration over a component carrier (CC) bandwidth, etc. As another example, the network can indicate permission for a non-connected UE to utilize connected-state RS for NR carrier RSSI calculation together with the indication of potential connected-state RS occasions to the non-connected UE.

In case the network does not explicitly grant or deny permission for the UE to utilize connected-state RS for NR carrier RSSI calculation, the UE can assume that it is not granted permission and rely on SSB for NR carrier RSSI calculation, as in legacy procedures. Alternately, the UE can assume that it is implicitly granted permission to use available connected-state RS for NR carrier RSSI calculation.

In some embodiments, the network can configure the UE with a connected-state RS measurement window, within which the UE can utilize available connected-state RS from all the sources (e.g., serving cell, neighbor cells, thermal noise, etc.) to calculate NR carrier RSSI.

In some embodiments, the UE may utilize power scaling between the connected-state RS and SSB in order to accurately calculate NR carrier RSSI based on connected-state RS. The UE can obtain scaling/offset information in advance (e.g., via RRC, broadcast SI, measurements, etc.) and then utilize it to scale measurements based on connected-state RS for consistency with SSS-based measurements. For example, a connected-state RS may be transmitted with a non-zero power offset with respect to SSS, and thus it is important to consider this offset to obtain accurate and/or reliable NR carrier RSSI measurements.

In some embodiments, the UE can determine the necessary power scaling based on respective measurements based on SSB and connected-state RS. For example, the UE may compute a first estimate of NR carrier RSSI based on SSB and a second estimate based on connected-state RS during one or more measurement occasions. Optionally, the UE may make compute first and second estimates over multiple measurement occasions, and filter/average the first estimates and the second estimates to obtain less noisy and/or more reliable first and second estimates. The UE can then compare the filtered or unfiltered estimates to determine an appropriate power scaling between the two types of NR carrier RSSI estimates.

In other embodiments, the UE can be provided with the power scaling between SSB and relevant connected-state RS by the network, e.g. in broadcast SI, dedicated RRC message, or a combination thereof. For example, the power scaling can be signaled together with the connected-state RS configuration provided to UEs operating in a non-connected state.

In the following description, it is assumed that the UE receives a configuration or pre-configuration such that the UE is able to utilize connected-state RS to calculate SS-RSRP and/or NR carrier RSSI, and thus SS-RSRQ if either or both of its constituent parameters can be estimated utilizing connected-state RS. This can be done in any of the ways described above.

In some embodiments, the UE may decide to employ connected-state RS for serving cell and/or neighbor cell measurements, e.g., if by employing TRS the UE can skip some SSB measurements and thus stay longer in sleep and thereby reduce energy consumption. The UE may estimate the expected power consumption obtained using conventional (SSB-only) measurements, including sleep periods between and/or sleep transitions associated with waking up for SSB measurement, and alternative power consumption obtained utilizing connected-state RS with reduced number of wake-ups or shortened intermediate sleep segments. If the measurements based on connected-state RS result in power savings, or savings exceed a threshold, the UE may select to perform TRS-based cell selection measurements.

The UE may regularly but infrequently perform duplicate RSRP/RSSI/RSRQ measurements, based on SSB and connected-state RS, and monitor the correspondence. If the difference exceeds a threshold, the UE may revert to conventional SSB-based measurements.

Although the above description is based on configuration or pre-configuration of the UE, this is not necessary in other embodiments. For example, the UE may use the principles described above in a proprietary manner without relying on pre-configuration or network configuration. If the non-connected-state UE determines that connected-state RS are available (using standardized or proprietary approaches) and that utilizing them for cell reselection measurements can reduce UE energy consumption, the UE can autonomously perform RSRP and/or RSSI measurements based on connected-state RS (instead of SSB), and use the results instead of conventional SS-RSRP and SS-RSRQ. In some variants, the UE can perform required power scaling estimation and correction as described above.

In some embodiments, the non-connected-state UE can determine that connected-state RS are available based on explicit indication from the network, e.g., via broadcast SI, an RRCRelease message transitioning the UE from connected- to non-connected-state, or other dedicated signaling. In other embodiments, the non-connected-state UE can determine that connected-state RS are available based on blind decoding of transmissions in the serving call and/or neighbor cells. For example, the UE can acquire potential occasions of neighbor cell connected state RS by blinding decoding of higher layer signaling in the neighbor cells. As a more specific example, the network may broadcast the potential occasions of the connected-state RS (e.g., TRS) in the SI for the neighbor cell(s). The UE can first blindly decode neighbor cell SSB (e.g., as part of neighbor cell measurements), and thus obtain information regarding the other SIBs in neighbor cell SI, including SIB(s) indicating potential occasions of neighbor cell connected state RS.

Various features of the embodiments described above correspond to various operations illustrated in FIGS. 10-11, which show exemplary methods (e.g., procedures) for a UE and a network node, respectively. In other words, various features of the operations described below correspond to various embodiments described above. Furthermore, the exemplary methods shown in FIGS. 10-11 can be used cooperatively to provide various exemplary benefits described herein. Although FIGS. 10-11 show specific blocks in particular orders, the operations of the exemplary methods can be performed in different orders than shown and can be combined and/or divided into blocks having different functionality than shown. Optional blocks or operations are indicated by dashed lines.

In particular, FIG. 10 shows an exemplary method (e.g., procedure) for cell reselection by a UE in a wireless network, according to various embodiments of the present disclosure. The exemplary method can be performed by a UE (e.g., wireless device, IoT device, etc.) operating in the wireless network (e.g., E-UTRAN, NG-RAN), such as UEs described elsewhere herein.

The exemplary method can include the operations of block 1020, where the UE can determine one or more first resources associated with transmission of connected-state reference signals (RS), by the wireless network, in the UE's serving cell and/or one or more neighbor cells while the UE is in a non-connected state. The exemplary method can also include the operations of block 1050, where the UE can, using the one or more first resources, perform cell reselection measurements on the connected-state RS transmitted in the serving cell and/or in any of the neighbor cells.

In various embodiments, the cell reselection measurements performed on the connected-state RS can include any of the following: reference signal received power (RSRP); carrier received signal strength indication (RSSI); and reference signal received quality (RSRQ). In some embodiments, the cell reselection measurements can be performed on one or more of the following connected-state RS: channel state information RS (CSI-RS) for tracking, tracking RS (TRS), and CSI-RS for mobility.

In some embodiments, the exemplary method can also include the operations of block 1085, where the UE can scale the cell reselection measurements based on a scaling factor related to a difference between respective transmission powers for the connected-state RS and for SSB.

In various embodiments, the scaling factor can be received from a network node that provides the UE's serving cell or can be determined by the UE, as discussed in more detail below.

In some embodiments, the exemplary method can also include the operations of block 1010, where the UE can receive, from the network node that provides the serving cell, a measurement configuration including one or more of the following:

- a first indication of UE permission to utilize the connected-state RS for cell reselection measurements;
- a second indication of a specific type of connected-state RS usable for cell reselection measurements;
- a third indication of at least one resource associated with transmission of connected-state RS usable for cell reselection measurements; and
- a scaling factor related to a difference between respective transmission powers for the connected-state RS and for SSB.

In some of these embodiments, the cell reselection measurements can be performed (e.g., in block 1050) based on receiving the first indication of UE permission in block 1010. In some of these embodiments, the third indication can indicate a measurement window during which connected-state RS transmitted in the serving cell and the neighbor cells are usable for the cell reselection measurements.

In some embodiments, the determining operations of block 1020 can include the operations of sub-block 1021, where the UE can select the one or more first resources from the at least one resource indicated by the third indication (e.g., received in block 1010). In other embodiments, the determining operations of block 1020 can include the operations of sub-block 1022, where the UE can perform blind decoding of system information (SI) broadcast in the one or more neighbor cells to determine the one or more first resources.

In some embodiments, the exemplary method can also include the operations of block 1060, where the UE can perform further cell reselection measurements based on SSB transmitted by the wireless network in the UE's serving cell and/or in one or more neighbor cells. In some of these embodiments, the exemplary method can also include the operations of blocks 1070-1075, where the UE can determine whether a difference between the cell reselection measurements and the further cell reselection measurements exceeds a threshold and, when the difference exceeds the threshold, refrain from performing subsequent cell reselection measurements based on connected-state RS. For example, the UE may perform the subsequent cell reselection measurements based on SSB instead.

In some of these embodiments, the exemplary method can also include the operations of blocks 1080-1085, where the UE can estimate a scaling factor between respective transmission powers for the connected-state RS and for the SSB based on the cell reselection measurements and the further cell reselection measurements, and scale the cell reselection measurements based on the estimated scaling factor.

In some embodiments, the exemplary method can also include the operations of blocks 1030-1040, where the UE can estimate a first expected energy consumption associated with cell reselection measurements based on the connected-state RS and estimate a second expected energy consumption associated with cell reselection measurements based on SSB. In such embodiments, performing cell reselection measurements on the connected-state RS (e.g., in block 1050) can be based on the first expected energy consumption being less than the second expected energy consumption.

In some embodiments, the one or more first resources used to perform the cell reselection measurements can include any of the following: time-domain resources (e.g., slots, symbols, periodicity, offset, etc.), frequency-domain resources (e.g., frequency band, number of PRBs, starting PRB, density, etc.), code-domain resources (e.g., ports, CDM values and/or patterns, etc.), and one or more first occasions.

In some of these embodiments, the exemplary method can also include the operations of block 1090, where the UE can remain in a low-energy state during one or more second occasions during which SSB is transmitted by the wireless network (e.g., in the UE's serving cell and/or neighbor cells). This can be facilitated by performing the cell reselection measurements on the connected-state RS (e.g., in block 1050) during the first occasions, such that the UE may not have to wake up to perform cell reselection measurements on SSB during the second occasions in a conventional manner. This can reduce overall UE energy consumption.

In some of these embodiments, the UE can be preconfigured to use the connected-state RS for cell reselection measurements during the one or more first occasions. As an example, the UE does not need explicit permission from the network (e.g., based on receiving a first indication in block 1010) to use the connected-state RS for reselection measurements, including during the first occasions when the UE determines that such connected-state RS are available for cell reselection measurements.

In some embodiments, the exemplary method can also include the operations of block 1095, where the UE can perform cell reselection to one of the neighbor cells based on the cell reselection measurements (e.g., performed in block 1050).

In addition, FIG. 11 shows an exemplary method (e.g., procedure) to facilitate cell reselection by one or more UEs being served by a cell in a wireless network, according to various embodiments of the present disclosure. The exemplary method can be performed by a network node (e.g., base station, eNB, gNB, ng-eNB, etc., or component thereof) serving the cell in the wireless network (e.g., E-UTRAN, NG-RAN), such as network node described elsewhere herein.

The exemplary method can include the operations of block 1120, where the network node can transmit, to one or more UEs, a measurement configuration including one or more of the following:

- a first indication of UE permission to utilize connected-state RS for cell reselection measurements;
- a second indication of a specific type of connected-state RS usable for cell reselection measurements;
- a third indication of at least one resource associated with transmission of connected-state RS usable for cell reselection measurements by the UEs; and
- a scaling factor related to a difference between respective transmission powers for the connected-state RS and for SSB.

The exemplary method can also include the operations of block 1130, where the network node can, while the one or more UEs are in a non-connected state, transmit the connected-state RS in the serving cell using one or more first resources.

In some embodiments, the one or more first resources used to transmit the connected-state RS can be included in the at least one resource indicated by the third indication.

In various embodiments, the cell reselection measurements on the connected-state RS can include any of the following: RSRP, RSSI, and RSRQ. In some embodiments, the connected-state RS transmitted in the serving cell during the one or more first occasions can include any of the following: CSI-RS for tracking, TRS, and CSI-RS for mobility.

In some embodiments, the exemplary method can also include the operations of block 1110, where the network node can determine whether to grant UE permission to utilize the connected-state RS for cell reselection measurements based one or more of the following related to transmission of the connected-state RS: expected transmission duration, and expected variations in transmission power and/or transmission configuration over a bandwidth comprising the connected-state RS. For example, this determination can be a basis for a first indication included in the measurement configuration sent in block 1120.

In some embodiments, the third indication can indicate a measurement window during which connected-state RS transmitted in the serving cell and the neighbor cells are usable for cell reselection measurements by the one or more UEs.

In some embodiments, the one or more first resources used to transmit the connected-state RS can include any of the following: time-domain resources (e.g., slots, symbols, periodicity, offset, etc.), frequency-domain resources (e.g., frequency band, number of PRBs, starting PRB, density, etc.), code-domain resources (e.g., ports, CDM values and/or patterns, etc.), and one or more first occasions. In some of these embodiments, the exemplary method can also include the operations of block 1140, where the network node can transmit SSB in the serving cell during one or more second occasions while the one or more UEs are in the non-connected state. In such embodiments, transmitting the connected-state RS during the first occasions (e.g., in block 1130) can facilitate the one or more UEs to remain in a low-energy state during the second occasions. In other words, when a UE performs cell reselection measurements on the connected-state RS during the first occasions, the UE may not have to wake up to perform cell reselection measurements on SSB during the second occasions in a conventional manner, thereby reducing overall UE energy consumption.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 12:
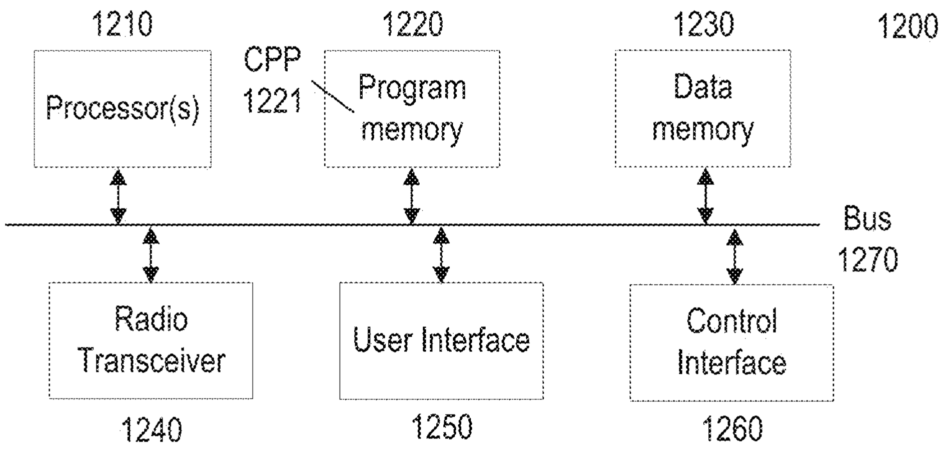
FIG. 12 shows a block diagram of an exemplary wireless device or UE, according to various embodiments of the present disclosure.

FIG. 12 shows a block diagram of an exemplary wireless device or user equipment (UE) 1200 (hereinafter referred to as "UE 1200") according to various embodiments of the present disclosure, including those described above with reference to other figures. For example, UE 1200 can be configured by execution of instructions, stored on a computer-readable medium, to perform operations corresponding to one or more of the exemplary methods described herein.

UE 1200 can include a processor 1210 (also referred to as "processing circuitry") that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product, CPP, 1221) that, when executed by processor 1210, can configure and/or facilitate UE 1200 to perform various operations, including operations corresponding to various exemplary methods described herein. As part of or in addition to such operations, execution of such instructions can configure and/or facilitate UE 1200 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1240, user interface 1250, and/or control interface 1260.

As another example, processor 1210 can execute program code stored in program memory 1220 that corresponds to MAC, RLC, PDCP, and RRC layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1210 can execute program code stored in program memory 1220 that, together with radio transceiver 1240, implements device-to-device (D2D) communications with other compatible devices and/or UEs.

Program memory 1220 can also include software code executed by processor 1210 to control the functions of UE 1200, including configuring and controlling various components such as radio transceiver 1240, user interface 1250, and/or control interface 1260. Program memory 1220 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from UE 1200, from which the instructions can be downloaded into program memory 1220 located within or removably coupled to UE 1200, so as to enable execution of such instructions.

Data memory 1230 can include memory area for processor 1210 to store variables used in protocols, configuration, control, and other functions of UE 1200, including operations corresponding to, or comprising, any of the exemplary methods described herein. Moreover, program memory 1220 and/or data memory 1230 can include non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed.

Persons of ordinary skill will recognize that processor 1210 can include multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of UE 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1240 can include radio-frequency transmitter and/or receiver functionality that facilitates the UE 1200 to communicate with other equipment supporting like wireless communication standards and/or protocols. In some embodiments, the radio transceiver 1240 includes one or more transmitters and one or more receivers that enable UE 1200 to communicate according to various protocols and/or methods proposed for standardization by 3GPP and/or other standards bodies. For example, such functionality can operate cooperatively with processor 1210 to implement a PHY layer based on OFDM, OFDMA, and/or SC-FDMA technologies, such as described herein with respect to other figures.

In some embodiments, radio transceiver 1240 includes one or more transmitters and one or more receivers that can facilitate the UE 1200 to communicate with various LTE, LTE-Advanced (LTE-A), and/or NR networks according to standards promulgated by 3GPP. In some embodiments of the present disclosure, the radio transceiver 1240 includes circuitry, firmware, etc. necessary for the UE 1200 to communicate with various NR, NR-U, LTE, LTE-A, LTE-LAA, UMTS, and/or GSM/EDGE networks, also according to 3GPP standards. In some embodiments, radio transceiver 1240 can include circuitry supporting D2D communications between UE 1200 and other compatible devices.

In some embodiments, radio transceiver 1240 includes circuitry, firmware, etc. necessary for the UE 1200 to communicate with various CDMA2000 networks, according to 3GPP2 standards. In some embodiments, the radio transceiver 1240 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1240 can include a transceiver that is capable of wired communication, such as by using IEEE 802.3 Ethernet technology. The functionality particular to each of these embodiments can be coupled with and/or controlled by other circuitry in the UE 1200, such as the processor 1210 executing program code stored in program memory 1220 in conjunction with, and/or supported by, data memory 1230.

User interface 1250 can take various forms depending on the particular embodiment of UE 1200, or can be absent from UE 1200 entirely. In some embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Some embodiments of the UE 1200 having a touch screen display are capable of receiving user inputs, such as inputs related to exemplary methods described herein or otherwise known to persons of ordinary skill.

In some embodiments, UE 1200 can include an orientation sensor, which can be used in various ways by features and functions of UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 120-degree change in physical orientation of the device. In this exemplary manner, the application program can maintain the screen display in a manner that is readable by the user, regardless of the physical orientation of the device. In addition, the output of the orientation sensor can be used in conjunction with various embodiments of the present disclosure.

A control interface 1260 of the UE 1200 can take various forms depending on the particular embodiment of UE 1200 and of the particular interface requirements of other devices that the UE 1200 is intended to communicate with and/or control. For example, the control interface 1260 can comprise an RS-232 interface, a USB interface, an HDMI interface, a Bluetooth interface, an IEEE ("Firewire") interface, an $I^2C$ interface, a PCMCIA interface, or the like. In some embodiments of the present disclosure, control interface 1260 can comprise an IEEE 802.3 Ethernet interface such as described above. In some embodiments of the present disclosure, the control interface 1260 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the UE 1200, including any program code corresponding to and/or embodying any embodiments (e.g., of methods) described herein.

Figure 13:
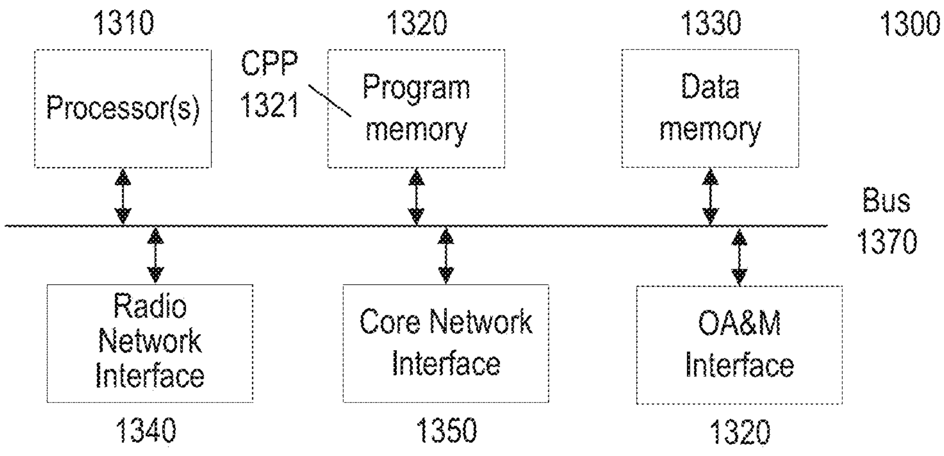
FIG. 13 shows a block diagram of an exemplary network node, according to various embodiments of the present disclosure.

FIG. 13 shows a block diagram of an exemplary network node 1300 according to various embodiments of the present disclosure, including those described above with reference to other figures. For example, exemplary network node 1300 can be configured by execution of instructions, stored on a computer-readable medium, to perform operations corresponding to one or more of the exemplary methods described herein. In some embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 can include processor 1310 (also referred to as "processing circuitry") that is operably connected to program memory 1320 and data memory 1330 via bus 1370, which can include parallel address and data buses, serial ports, or other methods and/or structures known to those of ordinary skill in the art.

Program memory 1320 can store software code, programs, and/or instructions (collectively shown as computer program product, CPP, 1321) that, when executed by processor 1310, can configure and/or facilitate network node 1300 to perform various operations, including operations corresponding to various exemplary methods described herein. As part of and/or in addition to such operations, program memory 1320 can also include software code executed by processor 1310 that can configure and/or facilitate network node 1300 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1340 and/or core network interface 1350. By way of example, core network interface 1350 can comprise the S1 or NG interface and radio network interface 1340 can comprise the Uu interface, as standardized by 3GPP. Program memory 1320 can also comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can include multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some embodiments, interface 1340 can also enable network node 1300 to communicate with compatible satellites of a satellite communication network. In some embodiments, radio network interface 1340 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1340. According to further embodiments of the present disclosure, the radio network interface 1340 can comprise a PHY layer based on OFDM, OFDMA, and/or SC-1-DMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some embodiments, core network interface 1350 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1300 can include hardware and/or software that configures and/or facilitates network node 1300 to communicate with other network nodes in a RAN, such as with other eNBs, gNBs, ng-eNBs, en-gNBs, IAB nodes, etc. Such hardware and/or software can be part of radio network interface 1340 and/or core network interface 1350, or it can be a separate functional unit (not shown). For example, such hardware and/or software can configure and/or facilitate network node 1300 to communicate with other RAN nodes via the X2 or Xn interfaces, as standardized by 3GPP.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
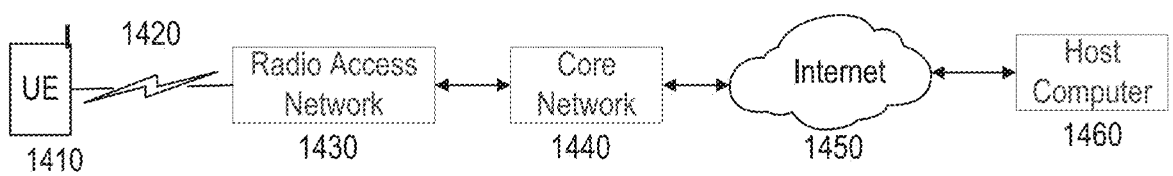
FIG. 14 shows a block diagram of an exemplary network configured to provide over-the-top (OTT) data services between a host computer and a UE, according to various embodiments of the present disclosure.

FIG. 14 is a block diagram of an exemplary communication network configured to provide over-the-top (OTT) data services between a host computer and a user equipment (UE), according to one or more embodiments of the present disclosure. UE 1410 can communicate with radio access network (RAN) 1430 over radio interface 1420, which can be based on protocols described above including, e.g., LTE, LTE-A, and 5G/NR. For example, UE 1410 can be configured and/or arranged as shown in other figures discussed above.

RAN 1430 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1430 can cooperatively operate using licensed and unlicensed spectrum. In some embodiments, RAN 1430 can include, or be capable of communication with, one or more satellites comprising a satellite access network.

RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1450 described above. In some embodiments, RAN 1430 and core network 1440 can be configured and/or arranged as shown in other figures discussed above. For example, eNBs comprising an E-UTRAN 1430 can communicate with an EPC core network 1440 via an S1 interface. As another example, gNBs and ng-eNBs comprising an NG-RAN 1430 can communicate with a 5GC core network 1430 via an NG interface.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 14 can also include measurement procedures and/or sensors that monitor network performance metrics including data rate, latency and other factors that are improved by embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Embodiments described herein enable and/or facilitate a UE to be configured with, and to utilize, connected-state RS for performing cell reselection measurements while operating in a non-connected state (e.g., RRC_IDLE or RRC_INACTIVE), such as non-SSB RS that are conventionally available only to UEs in RRC_CONNECTED state. Based on receiving such indications, the UE can select appropriate RS according to various criteria, including energy consumption. For example, such flexibility enables a UE in a non-connected state to optimize sleep time and reduce energy consumption by choosing connected-state RS for cell reselection measurements instead of having to rely on non-connected state RS such as SSB. When used in NR UEs (e.g., UE 1410) and gNBs (e.g., gNBs comprising RAN 1430), embodiments described herein can increase the use of data services by allowing the UE to allocate a greater portion of its stored energy for data services (e.g., eMBB) while in connected state. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for cell reselection by a user equipment (UE) in a wireless network, the method comprising:
- determining one or more first resources associated with transmission of connected-state reference signals (RS), by the wireless network, in the UE's serving cell and/or one or more neighbor cells while the UE is in a non-connected state; and
- using the one or more first resources, performing cell reselection measurements on the connected-state RS transmitted in the serving cell and/or in any of the neighbor cells.

A2. The method of embodiment A1, further comprising scaling the cell reselection measurements based on a scaling factor related to a difference between respective transmission powers for the connected-state RS and for synchronization signal/PBCH block (SSB).

A3. The method of any of embodiments A1-A2, further comprising receiving, from a network node that provides the serving cell, a measurement configuration including one or more of the following:
- a first indication of UE permission to utilize the connected-state RS for cell reselection measurements;
- a second indication of a specific type of connected-state RS usable for cell reselection measurements;
- a third indication of at least one resource associated with transmission of connected-state RS usable for cell reselection measurements; and
- a scaling factor related to a difference between respective transmission powers for the connected-state RS and for synchronization signal/PBCH block (SSB).

A4. The method of embodiment A3, wherein the cell reselection measurements are performed based on receiving the first indication of UE permission.

A5. The method of any of embodiments A3-A4, wherein determining the one or more first resources comprises selecting the one or more first resources from the at least one resource indicated by the third indication.

A6. The method of any of embodiments A3-A5, wherein the third indication indicates a measurement window during which connected-state RS transmitted in the serving cell and the neighbor cells are usable for cell reselection measurements.

A6a. The method of any of embodiments A1-A2, wherein determining the one or more first resources comprises performing blind decoding of system information (SI) broadcast in the one or more neighbor cells.

A7. The method of any of embodiments A1-A6a, further comprising performing further cell reselection measurements based on synchronization signal/PBCH block (SSB) transmitted by the wireless network in the UE's serving cell and/or in one or more neighbor cells.

A8. The method of embodiment A7, further comprising:
determining whether a difference between the cell reselection measurements and the further cell reselection measurements exceeds a threshold; and
when the difference exceeds the threshold, refraining from performing subsequent cell reselection measurements based on connected-state RS.

A9. The method of embodiment A7, further comprising:
based on the cell reselection measurements and the further cell reselection measurements, estimating a scaling factor between respective transmission powers for the connected-state RS and for the SSB; and
scaling the cell reselection measurements based on the estimated scaling factor.

A10. The method of any of embodiments A1-A9, wherein the cell reselection measurements performed on the connected-state RS include any of the following: reference signal received power (RSRP); carrier received signal strength indication (RSSI); and reference signal received quality (RSRQ).

A11. The method of any of embodiments A1-A10, further comprising:
estimating a first expected energy consumption associated with cell reselection measurements based on the connected-state RS; and
estimating a second expected energy consumption associated with cell reselection measurements based on synchronization signal/PBCH block (SSB),
wherein performing cell reselection measurements on the connected-state RS is based on the first expected energy consumption being less than the second expected energy consumption.

A12. The method of any of embodiments A1-A11, wherein the one or more first resources used to perform the cell reselection measurements include any of the following:
time-domain resources;
frequency-domain resources;
code-domain resources; and
one or more first occasions.

A12a. The method of embodiment A12, further comprising remaining in a low-energy state during one or more second occasions when synchronization signal/PBCH block (SSB) is transmitted by the wireless network.

A12b. The method of embodiment A12, wherein the UE is preconfigured to use the connected-state RS for cell reselection measurements during the one or more first occasions.

A13. The method of any of embodiments A1-A12b, further comprising performing cell reselection to one of the neighbor cells based on the cell reselection measurements.

A14. The method of any of embodiments A1-A13, wherein the cell reselection measurements are performed on one or more of the following connected-state RS:
channel state information RS (CSI-RS) for tracking,
tracking RS (TRS), and
CSI-RS for mobility.

B1. A method, for a network node serving a cell in a wireless network, to facilitate cell reselection by one or more user equipment (UEs) being served by the cell, the method comprising:
transmitting, to the one or more UEs, a measurement configuration including one or more of the following:
a first indication of UE permission to utilize connected-state reference signals (RS) for cell reselection measurements,
a second indication of a specific type of connected-state RS usable for cell reselection measurements,
a third indication of at least one resource associated with transmission of connected-state RS usable for cell reselection measurements, and
a scaling factor related to a difference between respective transmission powers for the connected-state RS and for synchronization signal/PBCH block (SSB); and
while the one or more UEs are in a non-connected state, transmitting the connected-state RS in the serving cell using one or more first resources.

B2. The method of embodiment B1, wherein the one or more first resources used to transmit the connected-state RS are included in the at least one resource indicated by the third indication.

B2a. The method of any of embodiments B1-B2, wherein the one or more first resources used to transmit the connected-state RS include any of the following:
time-domain resources;
frequency-domain resources;
code-domain resources; and
one or more first occasions.

B2b. The method of embodiment B2a, wherein:
the method further comprises transmitting SSB in the serving cell during one or more second occasions while the one or more UEs are in the non-connected state; and
transmitting the connected-state RS during the first occasions facilitates the one or more UEs to remain in a low-energy state during the second occasions.

B3. The method of any of embodiments B1-B2b, wherein the third indication indicates a measurement window during which connected-state RS transmitted in the serving cell and one or more neighbor cells are usable for cell reselection measurements.

B4. The method of any of embodiments B1-B3, wherein the cell reselection measurements include any of the following: reference signal received power (RSRP); carrier received signal strength indication (RSSI); and reference signal received quality (RSRQ).

B5. The method of any of embodiments B1-B4, further comprising determining whether to grant UE permission to utilize the connected-state RS for cell reselection measurements based one or more of the following related to transmission of the connected-state RS:
expected transmission duration; and
expected variations in transmission power and/or transmission configuration over a bandwidth comprising the connected-state RS.

B6. The method of any of embodiments B1-B5, wherein the connected-state RS transmitted in the serving cell during the one or more first occasions include any of the following:
channel state information RS (CSI-RS) for tracking,
tracking RS (TRS), and
CSI-RS for mobility.

C1. A user equipment (UE) configured to perform cell reselection in a wireless network, the UE comprising:
radio transceiver circuitry configured to communicate with a network node via a serving cell; and
processing circuitry operatively coupled to the radio transceiver circuitry, whereby the processing circuitry and the radio transceiver circuitry are configured to perform operations corresponding to any of the methods of embodiments A1-A14.

C2. A user equipment (UE) configured to perform cell reselection in a wireless network, the UE being further arranged to perform operations corresponding to any of the methods of embodiments A1-A14.

C3. A non-transitory, computer-readable medium storing computer-executable instructions that, when executed by processing circuitry of a user equipment (UE) configured to perform cell reselection in a wireless network, configure the UE to perform operations corresponding to any of the methods of embodiments A1-A14.

C4. A computer program product comprising computer-executable instructions that, when executed by processing circuitry of a user equipment (UE) configured to perform cell reselection in a wireless network, configure the UE to perform operations corresponding to any of the methods of embodiments A1-A14.

D1. A network node configured to serve a cell in a wireless network and to facilitate cell reselection by one or more user equipment (UEs) being served by the cell, the network node comprising:

radio network interface circuitry configured to communicate with the UEs; and processing circuitry operatively coupled to the radio network interface circuitry, whereby the processing circuitry and the radio network interface circuitry are configured to perform operations corresponding to any of the methods of embodiments B1-B6.

D2. A network node configured to serve a cell in a wireless network and to facilitate cell reselection by one or more user equipment (UEs) being served by the cell, the network node being further arranged to perform operations corresponding to any of the methods of embodiments B1-B6.

D3. A non-transitory, computer-readable medium storing computer-executable instructions that, when executed by processing circuitry of a network node configured to serve a cell in a wireless network and to facilitate cell reselection by one or more user equipment (UEs) being served by the cell, configure the network node to perform operations corresponding to any of the methods of embodiments B1-B6.

D4. A computer program product comprising computer-executable instructions that, when executed by processing circuitry of a network node configured to serve a cell in a wireless network and to facilitate cell reselection by one or more user equipment (UEs) being served by the cell, configure the network node to perform operations corresponding to any of the methods of embodiments B1-B6.

The invention claimed is:

1. A method for cell reselection by a user equipment (UE) configured to operate in a wireless network, the method comprising:

estimating a first expected energy consumption associated with cell reselection measurements based on the connected-state RS;

estimating a second expected energy consumption associated with cell reselection measurements based on synchronization signal/PBCH block (SSB);

determining one or more first resources associated with transmission of connected-state reference signals (RS) by the wireless network in the UE's serving cell and/or in one or more neighbor cells while the UE is in a non-connected state, wherein the one or more first resources are determined based on performing blind decoding of system information (SI) broadcast in the one or more neighbor cells; and based on the first expected energy consumption being less than the second expected energy consumption and using the one or more first resources, performing cell reselection measurements on the connected-state RS transmitted in the serving cell and/or in any of the neighbor cells.

2. The method of claim 1, further comprising scaling the cell reselection measurements based on a scaling factor related to a difference between respective transmission powers for the connected-state RS and for synchronization signal/PBCH block (SSB).

3. The method of claim 1, further comprising receiving, from a network node that provides the serving cell, a measurement configuration including one or more of the following:

a first indication of UE permission to utilize the connected-state RS for cell reselection measurements;

a second indication of a specific type of connected-state RS usable for cell reselection measurements;

a third indication of at least one resource associated with transmission of connected-state RS usable for cell reselection measurements; and a scaling factor related to a difference between respective transmission powers for the connected-state RS and for synchronization signal/PBCH block (SSB).

4. The method of claim 3, wherein the cell reselection measurements are performed based on receiving the first indication of UE permission.

5. The method of claim 3, wherein determining the one or more first resources comprises selecting the one or more first resources from the at least one resource indicated by the third indication.

6. The method of claim 3, wherein the third indication indicates a measurement window during which connected-state RS transmitted in the serving cell and the neighbor cells are usable for cell reselection measurements.

7. The method of claim 1, further comprising performing further cell reselection measurements based on synchronization signal/PBCH block (SSB) transmitted by the wireless network in the UE's serving cell and/or in one or more neighbor cells.

8. The method of claim 7, further comprising:

determining whether a difference between the cell reselection measurements and the further cell reselection measurements exceeds a threshold; and when the difference exceeds the threshold, refraining from performing subsequent cell reselection measurements based on connected-state RS.

9. The method of claim 7, further comprising:

based on the cell reselection measurements and the further cell reselection measurements, estimating a scaling factor between respective transmission powers for the connected-state RS and for the SSB; and scaling the cell reselection measurements based on the estimated scaling factor.

10. The method of claim 1, wherein the cell reselection measurements are performed on one or more of the following connected-state RS:

channel state information RS (CSI-RS) for tracking;

tracking RS (TRS); and

CSI-RS for mobility.

11. A user equipment (UE) configured to perform cell reselection in a wireless network, the UE comprising:
   radio transceiver circuitry configured to communicate with a network node via a serving cell; and
   processing circuitry operatively coupled to the radio transceiver circuitry, whereby the processing circuitry and the radio transceiver circuitry are configured to:
      estimate a first expected energy consumption associated with cell reselection measurements based on the connected-state RS;
      estimate a second expected energy consumption associated with cell reselection measurements based on synchronization signal/PBCH block (SSB);
      determine one or more first resources associated with transmission of connected-state reference signals (RS) by the wireless network in the UE's serving cell and/or in one or more neighbor cells while the UE is in a non-connected state, wherein the one or more first resources are determined based on performing blind decoding of system information (SI) broadcast in the one or more neighbor cells; and
      based on the first expected energy consumption being less than the second expected energy consumption and using the one or more first resources, perform cell reselection measurements on the connected-state RS transmitted in the serving cell and/or in any of the neighbor cells.

12. The UE of claim 11, wherein the processing circuitry and the radio transceiver circuitry are further configured to scale the cell reselection measurements based on a scaling factor related to a difference between respective transmission powers for the connected-state RS and for synchronization signal/PBCH block (SSB).

13. The UE of claim 11, wherein the processing circuitry and the radio transceiver circuitry are further configured to receive, from a network node that provides the serving cell, a measurement configuration including one or more of the following:
   a first indication of UE permission to utilize the connected-state RS for cell reselection measurements;
   a second indication of a specific type of connected-state RS usable for cell reselection measurements;
   a third indication of at least one resource associated with transmission of connected-state RS usable for cell reselection measurements; and
   a scaling factor related to a difference between respective transmission powers for the connected-state RS and for synchronization signal/PBCH block (SSB).

14. The UE of claim 13, wherein the cell reselection measurements are performed based on receiving the first indication of UE permission.

15. The UE of claim 13, wherein the processing circuitry and the radio transceiver circuitry are configured to determine the one or more first resources based on selecting the one or more first resources from the at least one resource indicated by the third indication.

16. The UE of claim 13, wherein the third indication indicates a measurement window during which connected-state RS transmitted in the serving cell and the neighbor cells are usable for cell reselection measurements.

17. The UE of claim 11, wherein the processing circuitry and the radio transceiver circuitry are further configured to perform further cell reselection measurements based on synchronization signal/PBCH block (SSB) transmitted by the wireless network in the UE's serving cell and/or in one or more neighbor cells.

18. The UE of claim 17, wherein the processing circuitry and the radio transceiver circuitry are further configured to:
   determine whether a difference between the cell reselection measurements and the further cell reselection measurements exceeds a threshold; and
   when the difference exceeds the threshold, refrain from performing subsequent cell reselection measurements based on connected-state RS.

19. The UE of claim 17, wherein the processing circuitry and the radio transceiver circuitry are further configured to:
   based on the cell reselection measurements and the further cell reselection measurements, estimate a scaling factor between respective transmission powers for the connected-state RS and for the SSB; and
   scale the cell reselection measurements based on the estimated scaling factor.

20. The UE of claim 11, wherein the cell reselection measurements are performed on one or more of the following connected-state RS:
   channel state information RS (CSI-RS) for tracking;
   tracking RS (TRS); and
   CSI-RS for mobility.

* * * * *